(12) United States Patent
Orimo

(10) Patent No.: US 10,632,840 B2
(45) Date of Patent: Apr. 28, 2020

(54) STRADDLED ELECTRIC VEHICLE AND ELECTRIC POWER UNIT

(71) Applicant: YAMAHA HATSUDOKI KABUSHIKI KAISHA, Iwata-shi, Shizuoka (JP)

(72) Inventor: Toshiro Orimo, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 237 days.

(21) Appl. No.: 15/828,526

(22) Filed: Dec. 1, 2017

(65) Prior Publication Data
US 2018/0154771 A1 Jun. 7, 2018

(30) Foreign Application Priority Data
Dec. 7, 2016 (JP) ................................. 2016-237716

(51) Int. Cl.
*B60K 17/08* (2006.01)
*F16H 61/32* (2006.01)
(Continued)

(52) U.S. Cl.
CPC ............... *B60K 17/08* (2013.01); *B60K 1/00* (2013.01); *B60K 17/02* (2013.01); *B60K 17/043* (2013.01); *B60K 17/046* (2013.01); *B62K 11/00* (2013.01); *B62M 9/00* (2013.01); *B62M 11/00* (2013.01); *B62M 11/10* (2013.01); *F02B 61/02* (2013.01); *F16H 37/12* (2013.01); *F16H 61/32* (2013.01);
(Continued)

(58) Field of Classification Search
CPC ........ B60K 17/08; B60K 17/02; B60K 17/04; F02B 61/02
See application file for complete search history.

(56) References Cited

U.S. PATENT DOCUMENTS 4,364,448 A * 12/1982 Ikuma .................. B60K 31/047
123/350
5,101,924 A * 4/1992 Yamagiwa ............... B62M 7/12
180/220
(Continued)

FOREIGN PATENT DOCUMENTS

CN 102463888 A 5/2012
EP 0 408 074 A1 1/1991
(Continued)

*Primary Examiner* — Anne Marie M Boehler
*Assistant Examiner* — Michael R Stabley
(74) *Attorney, Agent, or Firm* — Keating and Bennett, LLP

(57) ABSTRACT

A straddled electric vehicle includes an electric motor including an output shaft oriented in a direction perpendicular or substantially perpendicular to a vehicle width direction, a drive bevel gear that rotates around a rotation axis oriented in a direction perpendicular or substantially perpendicular to the vehicle width direction, a driven bevel gear that rotates around a rotation axis oriented in the vehicle width direction, and a drive pulley that rotates around a rotation axis which is oriented in the vehicle width direction. The drive bevel gear and the driven bevel gear convert rotation generated by the electric motor around a rotation axis oriented in a direction perpendicular or substantially perpendicular to the vehicle width direction into rotation around a rotation axis oriented in the vehicle width direction, which is transmitted to the drive pulley.

14 Claims, 13 Drawing Sheets

(51) Int. Cl.
*F16H 63/16* (2006.01)
*F02B 61/02* (2006.01)
*B60K 17/02* (2006.01)
*F16H 37/12* (2006.01)
*B62K 11/00* (2006.01)
*B60K 17/04* (2006.01)
*B62M 11/00* (2006.01)
*B62M 9/00* (2006.01)
*B60K 1/00* (2006.01)
*B62M 11/10* (2006.01)
*B62M 6/40* (2010.01)
*B60K 1/04* (2019.01)
*B62M 6/55* (2010.01)

(52) U.S. Cl.
CPC ...... *F16H 63/16* (2013.01); *B60K 2001/0466* (2013.01); *B60L 2200/12* (2013.01); *B60Y 2200/126* (2013.01); *B60Y 2400/73* (2013.01); *B62K 2202/00* (2013.01); *B62M 6/40* (2013.01); *B62M 6/55* (2013.01)

(56) References Cited

U.S. PATENT DOCUMENTS

| | | | | | |
|---|---|---|---|---|---|
| 5,222,572 | A * | 6/1993 | Yamagiwa | | B62M 7/04 180/220 |
| 5,406,154 | A * | 4/1995 | Kawaguchi | | B60L 7/10 310/67 R |
| 5,474,148 | A * | 12/1995 | Takata | | B62M 6/45 180/206.2 |
| 5,570,752 | A * | 11/1996 | Takata | | B62M 6/45 180/206.2 |
| 5,758,736 | A * | 6/1998 | Yamauchi | | B62M 6/45 180/220 |
| 5,829,546 | A * | 11/1998 | Tseng | | B62M 6/55 180/206.4 |
| 5,900,686 | A * | 5/1999 | Tabata | | B60L 50/50 310/71 |
| 5,901,807 | A * | 5/1999 | Tseng | | B62M 11/145 180/206.3 |
| 5,924,511 | A * | 7/1999 | Takata | | B60L 15/20 180/206.2 |
| 6,080,073 | A * | 6/2000 | Liu | | B62M 6/55 180/206.1 |
| 6,119,801 | A * | 9/2000 | Yamashita | | B62M 6/10 180/205.5 |
| 6,230,586 | B1 * | 5/2001 | Chang | | B62M 6/55 180/206.4 |
| 6,263,993 | B1 * | 7/2001 | Lin | | B62M 6/55 180/206.4 |
| 6,276,479 | B1 * | 8/2001 | Suzuki | | B62M 6/45 180/206.8 |
| 7,284,631 | B2 * | 10/2007 | Rizzetto | | B62M 6/55 180/206.4 |
| 7,497,288 | B2 * | 3/2009 | Tsukada | | B60K 1/00 180/68.1 |
| 9,315,231 | B2 * | 4/2016 | Gingl | | B62M 6/55 |
| 9,616,969 | B2 * | 4/2017 | MacMartin | | B62M 6/55 |

FOREIGN PATENT DOCUMENTS

| | | |
|---|---|---|
| GB | 1 504 121 A | 3/1978 |
| JP | 2004-210072 A | 7/2004 |
| JP | 2013-209079 A | 10/2013 |
| KR | 2003-0068692 A | 8/2003 |
| WO | 2014/184396 A2 | 11/2014 |

\* cited by examiner

STRADDLED ELECTRIC VEHICLE AND ELECTRIC POWER UNIT

CROSS REFERENCE TO RELATED APPLICATIONS

This application claims the benefit of priority to Japanese Patent Application No. 2016-237716 filed on Dec. 7, 2016. The entire contents of this application are hereby incorporated herein by reference.

BACKGROUND OF THE INVENTION

1. Field of the Invention

The present invention relates to a straddled electric vehicle and an electric power unit which includes an electric motor.

2. Description of the Related Art

A two-wheeled electric vehicle is a kind of straddled electric vehicle whose driving source is an electric motor. The electric motor rotates with the electric power that is supplied from a battery which is mounted on the two-wheeled electric vehicle, for example, such that the two-wheeled electric vehicle is able to travel.

In two-wheeled electric vehicles, the output power that is required of the electric motor is increasing from year to year. With increasing output power, the weight and volume of an electric motor has also been increasing, thus making the layout difficult within the vehicle which houses the electric motor.

Generally speaking, an electric motor is mounted on a two-wheeled electric vehicle in such a manner that its output shaft is oriented in the vehicle width direction (the right-left direction of the vehicle). This manner of disposition has a problem in that, as the electric motor becomes larger in size along the direction that the output shaft extends, the electric motor may protrude in the vehicle width direction.

One possible way of disposing the electric motor may be so that the output shaft of the electric motor is oriented in the front-rear direction of the vehicle. This will prevent the electric motor from protruding in the vehicle width direction even when it has a large size along the direction that the output shaft of the electric motor extends.

Japanese Laid-Open Patent Publication No. 2004-210072 discloses a two-wheeled electric vehicle in which an electric motor is disposed so that its output shaft is oriented in the front-rear direction of the vehicle. The two-wheeled electric vehicle disclosed in Japanese Laid-Open Patent Publication No. 2004-210072 adopts a secondary speed-reducing mechanism of a shaft-drive type.

The electric motor generates rotation around a rotation axis which is oriented in the front-rear direction of the vehicle. The rotation generated by the electric motor is transmitted to a primary speed-reducing mechanism. In the primary speed-reducing mechanism, rotation is transmitted from a gear having fewer teeth to a gear having more teeth, such that the rotation is decelerated. These gears of the primary speed-reducing mechanism each rotate around a rotation axis which is oriented in the front-rear direction of the vehicle. The rotation, having been decelerated in the primary speed-reducing mechanism, is transmitted to a propeller shaft that extends along the front-rear direction of the vehicle.

The rotation axis of the wheel shaft of the rear wheel defining a drive wheel is oriented in the vehicle width direction. At the rear end of the propeller shaft, a drive bevel gear is provided. A driven bevel gear is provided on the wheel shaft of the rear wheel. The drive bevel gear and the driven bevel gear are meshed with each other on a side of the rear wheel. The drive bevel gear and the driven bevel gear convert the rotation of the propeller shaft whose rotation axis is oriented in the front-rear direction of the vehicle into rotation whose rotation axis is oriented in the vehicle width direction, and transmit it to the wheel shaft of the rear wheel. As a result of this, rotation of the electric motor is transmitted to the rear wheel, such that the rear wheel rotates.

In the primary speed-reducing mechanism, deceleration of rotation is caused as the rotation is transmitted from a gear having fewer teeth to a gear having more teeth. A gear with a larger number of teeth is adopted in order to increase the deceleration ratio; however, as the number of teeth increases, the diameter of the gear also increases.

The two-wheeled electric vehicle disclosed in Japanese Laid-Open Patent Publication No. 2004-210072 is a vehicle which is meant for the young, and thus is not required to provide a large torque. In such a vehicle, the deceleration ratio does not need to be large, and therefore a gear with a large diameter does not need to be provided in the primary speed-reducing mechanism.

However, as the required torque increases, the deceleration ratio needs to become larger. Japanese Laid-Open Patent Publication No. 2013-209079 discloses a two-wheeled electric vehicle in which an electric motor is disposed so that the output shaft of the electric motor is oriented in the front-rear direction of the vehicle. The two-wheeled electric vehicle disclosed in Japanese Laid-Open Patent Publication No. 2013-209079 adopts a secondary speed-reducing mechanism of a shaft-drive type, and via a transmission path of motive power similar to that in Japanese Laid-Open Patent Publication No. 2004-210072, rotation of the electric motor is transmitted to the rear wheel. In the two-wheeled electric vehicle disclosed in Japanese Laid-Open Patent Publication No. 2013-209079, in order to attain a large deceleration ratio, a gear with a large number of teeth and a large diameter is provided in the primary speed-reducing mechanism. This leads to a problem in that the size of the primary speed-reducing mechanism in the vehicle width direction becomes large, such that the primary speed-reducing mechanism may protrude in the vehicle width direction.

In order to adopt a secondary speed-reducing mechanism of a shaft-drive type, a set consisting of a primary speed-reducing mechanism and a secondary speed-reducing mechanism needs to be developed for each individual model of a two-wheeled electric vehicle. This results in the problem of an increased development cost for the two-wheeled electric vehicle. In a shaft-drive type, the propeller shaft linearly extends in parallel to the rotation axis direction of the gear in the primary speed-reducing mechanism. Moreover, the drive bevel gear at the rear end of the propeller shaft, which extends linearly in parallel to the rotation axis direction of the gear, needs to be aligned with the driven bevel gear on a side of the rear wheel. Therefore, in the case in which a secondary speed-reducing mechanism of a shaft-drive type is adopted, substantial constraints are imposed on the layout of the electric motor, the primary speed-reducing mechanism, and the secondary speed-reducing mechanism.

SUMMARY OF THE INVENTION

Preferred embodiments of the present invention provide straddled electric vehicles and electric power units in which an electric motor and a primary speed-reducing mechanism are fitted compactly.

A straddled electric vehicle according to a preferred embodiment of the present invention includes an electric motor including an output shaft which is oriented in a direction perpendicular or substantially perpendicular to a vehicle width direction, the electric motor generating rotation around a rotation axis which is oriented in a direction perpendicular or substantially perpendicular to the vehicle width direction; a drive bevel gear that rotates around a rotation axis which is oriented in a direction perpendicular or substantially perpendicular to the vehicle width direction; a driven bevel gear that rotates around a rotation axis which is oriented in the vehicle width direction, the driven bevel gear meshing with the drive bevel gear; a drive pulley that rotates around a rotation axis which is oriented in the vehicle width direction; a driven pulley that rotates around a rotation axis which is oriented in the vehicle width direction; a drive belt to transmit rotation of the drive pulley to the driven pulley; and a drive wheel to which rotation of the driven pulley is transmitted, wherein the rotation generated in response to an output from the electric motor is transmitted to the drive bevel gear; the drive bevel gear and the driven bevel gear convert the rotation transmitted to the drive bevel gear into rotation around a rotation axis which is oriented in the vehicle width direction; and the rotation generated in response to transmission of rotation from the drive bevel gear to the driven bevel gear is transmitted to the drive pulley.

In a straddled electric vehicle according to a preferred embodiment of the present invention, the output shaft of the electric motor is oriented in a direction perpendicular or substantially perpendicular to the vehicle width direction. By using the drive bevel gear and the driven bevel gear, the rotation generated by the electric motor is converted into rotation around a rotation axis which is oriented in the vehicle width direction. By orienting the rotation axis in the vehicle width direction, even in the case in which a gear with a large number of teeth and a large diameter is provided in the primary speed-reducing mechanism, the size of the primary speed-reducing mechanism along the vehicle width direction is reduced.

By orienting the rotation axis in the vehicle width direction, it becomes possible to use a secondary speed-reducing mechanism including a drive pulley, a drive belt, and a driven pulley. Thus, there is no need to use a propeller shaft and bevel gears for the secondary speed-reducing mechanism, thus providing improved freedom in the layout of the electric motor, the primary speed-reducing mechanism, and the secondary speed-reducing mechanism.

Through mere adjustments of the respective sizes of the drive pulley, the drive belt, and the driven pulley, it is possible to use the same electric motor and primary speed-reducing mechanism commonly for a plurality of types of vehicle models, thus reducing development costs.

According to a preferred embodiment of the present invention, the straddled electric vehicle may further include a speed reducer which is disposed in a transmission path of motive power between the electric motor and the drive pulley. By using the speed reducer, the rotation is decelerated.

According to a preferred embodiment of the present invention, the speed reducer may be disposed in a transmission path of motive power between the driven bevel gear and the drive pulley; and rotation around a rotation axis which is oriented in the vehicle width direction may be transmitted to the speed reducer. Since the rotation axis of the speed reducer is oriented in the vehicle width direction, the size of the speed reducer along the vehicle width direction is reduced.

According to a preferred embodiment of the present invention, the driven bevel gear may have more teeth than does the drive bevel gear. Since the driven bevel gear has more teeth than does the drive bevel gear, the rotation is decelerated by using the drive bevel gear and the driven bevel gear.

According to a preferred embodiment of the present invention, the straddled electric vehicle may further include a centrifugal clutch which is disposed in a transmission path of motive power between the electric motor and the drive pulley.

When pushing the straddled electric vehicle, if the drive wheel and the electric motor are mechanically connected, the user needs to exert extra force on the vehicle to rotate the electric motor. As a result, the user needs to push the vehicle with a large force. When the electric motor is not being driven, the centrifugal clutch causes the drive wheel and the electric motor to be mechanically disconnected. As a result, the user is able to push along the vehicle with little force.

According to a preferred embodiment of the present invention, the centrifugal clutch may be disposed in a transmission path of motive power between the driven bevel gear and the drive pulley. When pushing the straddled electric vehicle, the centrifugal clutch causes the drive wheel and the driven bevel gear to be mechanically disconnected. Since it is not necessary to apply a load to cause rotation of the electric motor, the drive bevel gear, and the driven bevel gear, the user is able to push the straddled electric vehicle with less force.

According to a preferred embodiment of the present invention, the centrifugal clutch and the driven bevel gear may rotate around a same rotation axis. The centrifugal clutch and the driven bevel gear rotate around the same rotation axis as a center, rather than around different rotation axes. This allows a reduction in the size of the primary speed-reducing mechanism, including the centrifugal clutch, in the front-rear direction of the vehicle.

According to a preferred embodiment of the present invention, the centrifugal clutch may be disposed in a transmission path of motive power between the electric motor and the drive bevel gear. The rotation before being decelerated by the drive bevel gear and the driven bevel gear is transmitted to the centrifugal clutch. Therefore, even while the electric motor is rotating at a low speed, the centrifugal clutch is easily engaged. Moreover, the rotation before undergoing an increase in torque by the drive bevel gear and the driven bevel gear is transmitted to the centrifugal clutch; as a result, the load on the centrifugal clutch is reduced.

According to a preferred embodiment of the present invention, the centrifugal clutch and the output shaft of the electric motor may rotate around a same rotation axis. The centrifugal clutch and the output shaft of the electric motor rotate around the same rotation axis as a center, rather than around different rotation axes. This allows a reduction in the size of the primary speed-reducing mechanism, including the centrifugal clutch, in the vehicle width direction.

According to a preferred embodiment of the present invention, the straddled electric vehicle may further include a case housing at least a portion of the output shaft of the electric motor, the drive bevel gear, the driven bevel gear, and the centrifugal clutch, wherein the case may include a wall separating a bevel-gear space which accommodates the drive bevel gear and the driven bevel gear and a centrifugal-clutch space which accommodates the centrifugal clutch.

The bevel gears and the centrifugal clutch, which require respectively different kinds and/or amounts of lubricant, are accommodated in different spaces. This prevents the lubricant for one of the bevel gears and the centrifugal clutch from adhering to the other.

According to a preferred embodiment of the present invention, in a plan view of the vehicle, the electric motor may overlap a vehicle center line extending in a front-rear direction of the vehicle. By disposing the electric motor, which is a heavy object, near the center along the vehicle width direction, the straddled electric vehicle has a good weight balance.

According to a preferred embodiment of the present invention, in a plan view of the vehicle, the output shaft of the electric motor may overlap the vehicle center line. By disposing the output shaft of the electric motor near the center along the vehicle width direction, the straddled electric vehicle has a good weight balance.

According to a preferred embodiment of the present invention, in a plan view of the vehicle, the driven bevel gear may be disposed in one of a left region and a right region that are divided at a vehicle center line extending in a front-rear direction of the vehicle; and the drive pulley may be disposed in the other of the left region and the right region.

If both of the driven bevel gear and the drive pulley were disposed in one of a left region and a right region, the size of the vehicle in that region would increase. In order to reduce the size of the one region, the location of the electric motor might have to be shifted to the other region, for example. By disposing the driven bevel gear in one of the left region and the right region, and disposing the drive pulley in the other, it becomes possible to dispose the electric motor near the center along the vehicle width direction. While keeping the size of the primary speed-reducing mechanism along the vehicle width direction small, the straddled electric vehicle is provided with a good weight balance.

According to a preferred embodiment of the present invention, the straddled electric vehicle may further include a speed reducer which is disposed in a transmission path of motive power between the driven bevel gear and the drive pulley, wherein, in a plan view of the vehicle, the driven bevel gear may be disposed in one of a left region and a right region that are divided at a vehicle center line extending along a front-rear direction of the vehicle; and the speed reducer may be disposed in the other of the left region and the right region.

If both of the driven bevel gear and the speed reducer were disposed in one of a left region and a right region, the size of the vehicle in that region would increase. In order to reduce the size of the one region, the location of the electric motor might have to be shifted to the other region, for example. By disposing the driven bevel gear in one of the left region and the right region, and disposing the speed reducer in the other, it becomes possible to dispose the electric motor near the center along the vehicle width direction. While keeping the size of the primary speed-reducing mechanism along the vehicle width direction small, the straddled electric vehicle is provided with a good weight balance.

An electric power unit according to a preferred embodiment of the present invention includes an electric motor including an output shaft; a drive bevel gear that rotates around a rotation axis which is oriented in a direction that the output shaft extends; a driven bevel gear that rotates around a rotation axis which is oriented in a direction perpendicular or substantially perpendicular to the output shaft, the driven bevel gear meshing with the drive bevel gear; a driveshaft that rotates around a rotation axis which is oriented in a direction perpendicular or substantially perpendicular to the output shaft; and a case housing at least a portion of the output shaft of the electric motor, the drive bevel gear, the driven bevel gear, and at least a portion of the driveshaft, wherein the rotation generated by the electric motor is transmitted to the drive bevel gear; the drive bevel gear and the driven bevel gear convert the rotation transmitted to the drive bevel gear into rotation around a rotation axis which is oriented in a direction perpendicular or substantially perpendicular to the output shaft; and to an exterior of the electric power unit, the driveshaft outputs rotation around a rotation axis which is oriented in a direction perpendicular or substantially perpendicular to the output shaft, the output rotation resulting from transmission of rotation from the drive bevel gear to the driven bevel gear.

By using the drive bevel gear and the driven bevel gear, the rotation generated by the electric motor is converted into rotation around a rotation axis which is perpendicular or substantially perpendicular to the output shaft of the electric motor. This reduces the size of the electric power unit along the rotation axis of the rotation converted by the bevel gears.

In an implementation where the electric power unit is mounted to the straddled electric vehicle so that the output shaft of the electric motor is oriented in a direction perpendicular or substantially perpendicular to the vehicle width direction, the rotation axis of the driveshaft is oriented in the vehicle width direction. This makes it possible to use a secondary speed-reducing mechanism including a drive pulley, a drive belt, and a driven pulley in the straddled electric vehicle. Thus, there is no need to use a propeller shaft and bevel gears for the secondary speed-reducing mechanism of the straddled electric vehicle, thus improving the freedom in the layout of the electric power unit in the straddled electric vehicle.

In straddled electric vehicles according to preferred embodiments of the present invention, through mere adjustments of the respective sizes of the drive pulley, the drive belt, and the driven pulley, it is possible to use the same electric power unit commonly for a plurality of types of vehicle models, thus reducing development costs.

According to a preferred embodiment of the present invention, the electric power unit may further include a centrifugal clutch which is disposed in a transmission path of motive power between the electric motor and the driveshaft, wherein the case may house the centrifugal clutch.

In an electric power unit not including a centrifugal clutch, the driveshaft and the electric motor are mechanically connected even while the electric motor is not being driven. While the electric motor is not being driven, trying to rotate any member that is mechanically connected to the driveshaft with external force requires a large force. For example, when pushing a straddled electric vehicle in which an electric power unit is mounted, if the drive wheel and the electric motor are mechanically connected, the user needs to exert extra force on the vehicle to rotate the electric motor. As a result, the user needs to push the vehicle with a large force. In an electric power unit including a centrifugal clutch, while the electric motor is not being driven, the centrifugal clutch causes the driveshaft and the electric motor to be mechanically disconnected. Since the centrifugal clutch causes the drive wheel, which is mechanically connected to the driveshaft, to be mechanically disconnected from the electric motor, the user is able to push the vehicle with little force.

In a straddled electric vehicle according to a preferred embodiment of the present invention, the output shaft of the electric motor is oriented in a direction perpendicular or substantially perpendicular to the vehicle width direction. By using the drive bevel gear and the driven bevel gear, the rotation generated by the electric motor is converted into rotation around a rotation axis which is oriented in the vehicle width direction. By orienting the rotation axis in the vehicle width direction, even in the case in which a gear with a large number of teeth and a large diameter is provided in the primary speed-reducing mechanism, the size of the primary speed-reducing mechanism along the vehicle width direction is reduced.

By orienting the rotation axis in the vehicle width direction, it becomes possible to use a secondary speed-reducing mechanism including a drive pulley, a drive belt, and a driven pulley. Thus, there is no need to use a propeller shaft and bevel gears for the secondary speed-reducing mechanism, thus providing improved freedom in the layout of the electric motor, the primary speed-reducing mechanism, and the secondary speed-reducing mechanism Through mere adjustments of the respective sizes of the drive pulley, the drive belt, and the driven pulley, it is possible to use the same electric motor and primary speed-reducing mechanism commonly for a plurality of types of vehicle models, thus reducing development costs.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
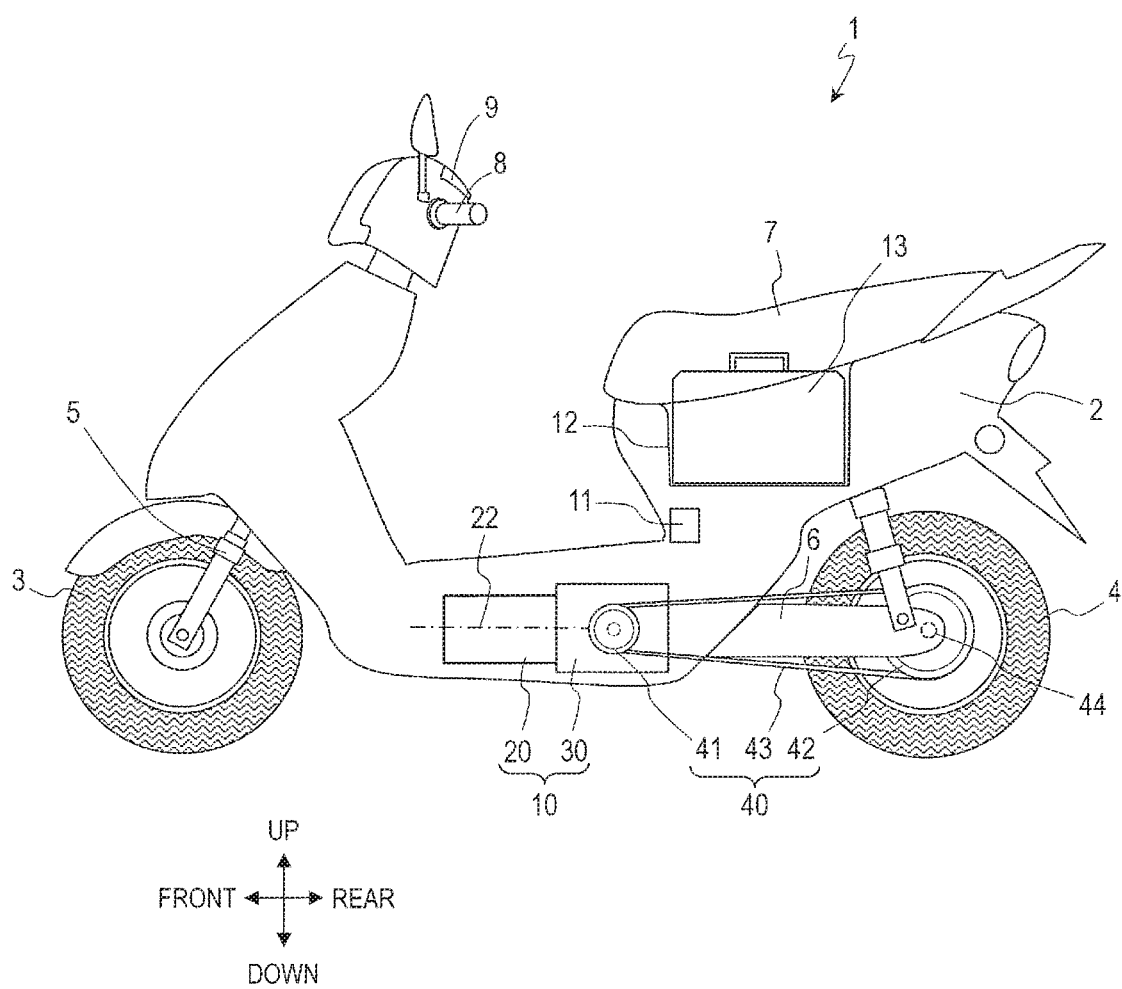
FIG. 1 is a side view showing a two-wheeled electric vehicle according to a preferred embodiment of the present invention.

Hereinafter, with reference to the drawings, preferred embodiments of the present invention will be described. Like elements are denoted by like reference numerals, and description of any overlapping elements will be omitted. Note that the present invention is not limited to the following preferred embodiments.

In the present specification, transmission of rotation from component element A to component element B is not limited to direct transmission of rotation from component element A to component element B only; when one or more other elements are present between component element A and component element B, rotation may well be said to be transmitted from component element A to component element B by way of the one or more other elements.

In the present specification, when component element C is said to be oriented in direction D, it is not necessary that component element C is exactly oriented in direction D, but component element C may be slightly inclined with respect to direction D, so long as it is substantially oriented in direction D.

FIG. 1 is a side view showing a straddled electric vehicle according to a preferred embodiment of the present invention. In the example shown in FIG. 1, the straddled electric vehicle is a two-wheeled electric vehicle 1 of a scooter type. Note that straddled electric vehicles according to preferred embodiments of the present invention are not limited to a two-wheeled electric vehicle of a scooter type as illustrated herein. A straddled electric vehicle according to preferred embodiments of the present invention may be any other type of two-wheeled electric vehicle, e.g., a so-called on-road type, an off-road type, or a moped type. Moreover, straddled electric vehicles according to preferred embodiments of the present invention are any arbitrary vehicle on which a rider sits astraddle, without being limited to two-wheeled vehicles. Straddled electric vehicles according to preferred embodiments of the present invention may be a three-wheeled vehicle (LMW) of a type whose direction of travel is changed as the vehicle body is tilted, etc., or any other straddled electric vehicle such as an ATV (All Terrain Vehicle).

In the following description, the front, rear, right, and left are respectively meant as the front, rear, right, and left as perceived by the rider of the two-wheeled electric vehicle 1.

As shown in FIG. 1, the two-wheeled electric vehicle 1 includes a vehicle body 2, a front wheel 3, a rear wheel 4, steering handle bars 8, an electric power unit 10, and a secondary speed-reducing mechanism 40. For ease of explanation, FIG. 1 shows portions of the interior of the two-wheeled electric vehicle 1 in a see-through manner.

The vehicle body 2 has a structure including a body frame and a body cover. The vehicle body 2 supports front forks 5.

The steering handle bars 8 are attached above the front forks 5. The front wheel 3 is supported at the lower end of the front forks 5. Near the steering handle bars 8, a display 9 is provided which displays various information such as velocity of travel, remaining battery power, operating modes, etc. The rear wheel 4 is swingingly supported by the vehicle body 2 via a swing arm 6. In this example, the rear wheel 4 is the drive wheel, whereas the front wheel 3 is a driven wheel.

The electric power unit 10 is located at a position in the vehicle body 2 between the front wheel 3 and the rear wheel 4. The electric power unit 10 includes an electric motor 20 and a primary speed-reducing mechanism 30. The secondary speed-reducing mechanism 40 is a speed-reducing mechanism of a belt drive type, for example. The secondary speed-reducing mechanism 40 includes a drive pulley 41, a driven pulley 42, and a drive belt 43.

Rotation which is generated by the electric motor 20 is transmitted to the primary speed-reducing mechanism 30, where it is decelerated. The rotation that has been decelerated by the primary speed-reducing mechanism is transmitted to the drive pulley 41 of the secondary speed-reducing mechanism 40. The drive belt 43, which is an endless belt, is wrapped around the drive pulley 41 and the driven pulley 42. Rotation of the drive pulley 41 is transmitted to the driven pulley 42 via the drive belt 43. Rotation of the driven pulley 42 is transmitted to a wheel shaft 44 of the rear wheel 4, such that the rear wheel 4 rotates. Thus, the two-wheeled electric vehicle 1 travels as the rotation of the electric motor 20 is transmitted to the rear wheel 4.

The two-wheeled electric vehicle 1 further includes a battery 13 which supplies electric power to the electric motor 20, and an MCU (Motor Control Unit) 11 which controls the operation of the electric motor 20.

The vehicle body 2 supports a seat 7 on which the rider sits. Below the seat 7 of the vehicle body 2 is provided a battery case 12, in which the battery 13 is housed. The battery case 12 preferably has the shape of a box with an open upper surface, such that the seat 7 covers over the upper surface of the battery case 12.

The battery 13 is detachable from the vehicle body 2. When detached from the vehicle body 2, the battery 13 may be connected to an external charger (not shown) for charging. The seat 7 is of a type that opens and closes. As the rider opens the seat 7 and lifts the battery 13 up while holding it, the rider is able to take the battery 13 out of the vehicle body 2.

When the two-wheeled electric vehicle 1 is to travel, the battery 13 is attached to the battery case 12. Electric power which is output from the battery 13 is supplied to the electric motor 20 via the MCU 11. Note that the number of batteries 13 is not limited to one; two or more batteries 13 may be accommodated in the battery case 12.

Instead of being detachable, the battery 13 may be fixed on the vehicle body 2 so that it does not permit detachment. The phrase "the battery 13 does not permit detachment" may mean, for example, that some tool is required to detach the battery 13, e.g., because the battery 13 is fixed on the vehicle body 2 with, for example, bolts and nuts, or the like. In this case, a charging cable which extends from an external charger may be connected to the two-wheeled electric vehicle 1 to enable charging of the battery 13.

Figure 2:
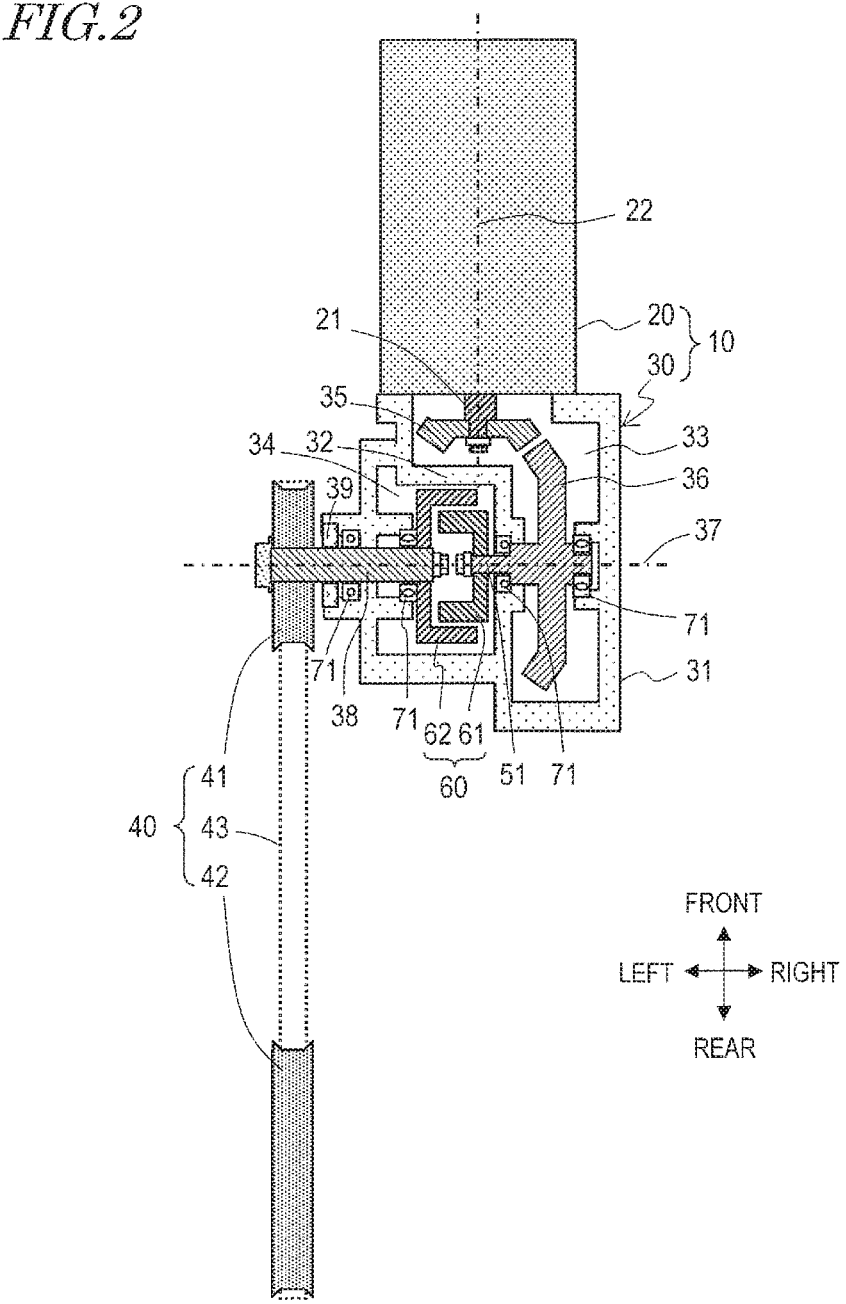
FIG. 2 is a cross-sectional view showing an electric power unit and a secondary speed-reducing mechanism according to a preferred embodiment of the present invention.
Figure 3:
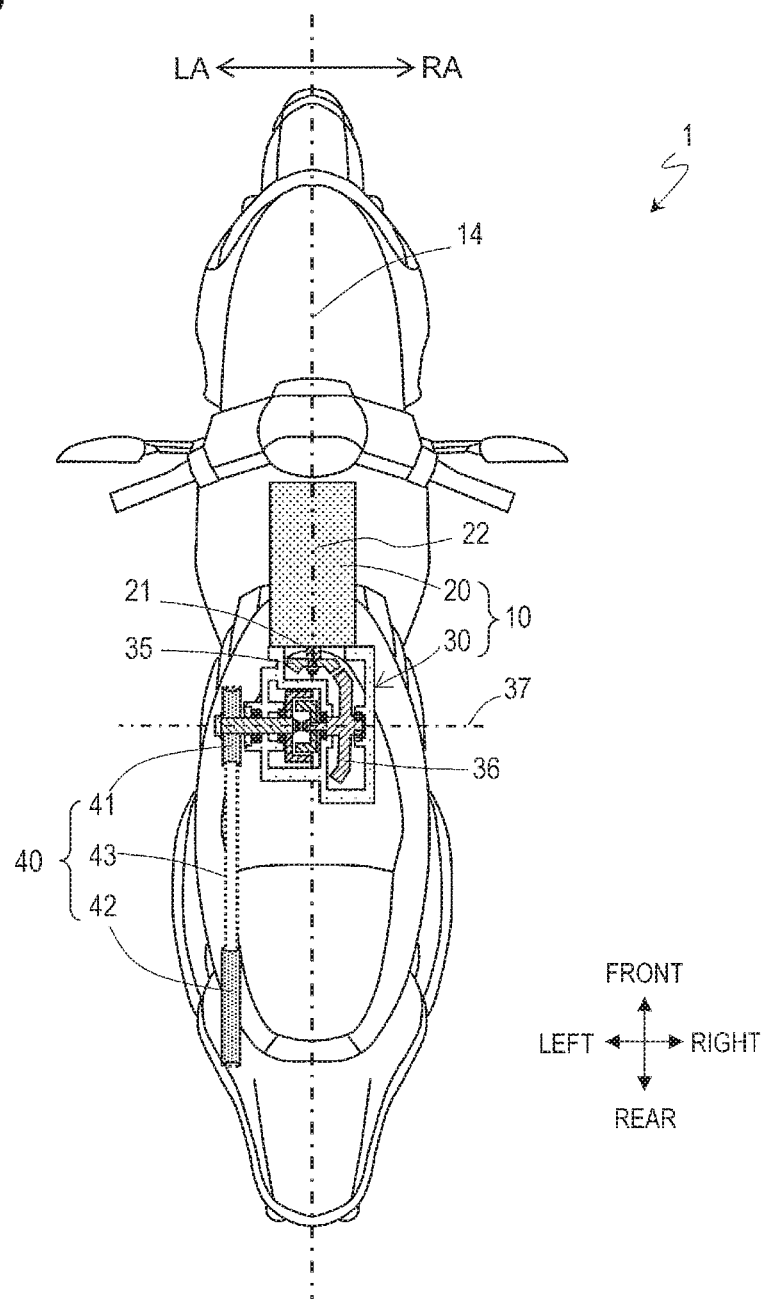
FIG. 3 is a plan view showing a two-wheeled electric vehicle according to a preferred embodiment of the present invention.

FIG. 2 is a cross-sectional view showing the electric power unit 10 and the secondary speed-reducing mechanism 40. FIG. 3 is a plan view showing the two-wheeled electric vehicle 1. For ease of explanation, FIG. 3 shows the electric power unit 10 and the secondary speed-reducing mechanism 40 in a see-through manner.

The electric power unit 10 is disposed in the two-wheeled electric vehicle 1 so that an output shaft 21 of the electric motor 20 is oriented in a direction perpendicular or substantially perpendicular to the vehicle width direction. That is, a rotation axis 22 of the electric motor 20 is oriented in a direction perpendicular or substantially perpendicular to the vehicle width direction. The vehicle width direction is the right-left direction of the two-wheeled electric vehicle 1. In the example shown in FIG. 1 to FIG. 3, the electric power unit 10 is disposed on the two-wheeled electric vehicle 1 so that the output shaft 21 of the electric motor 20 is oriented in the front-rear direction of the vehicle. In other words, the rotation axis 22 of the electric motor 20 is oriented in the front-rear direction of the vehicle. The electric motor 20 generates rotation around the rotation axis 22 as a center.

By disposing the electric motor 20 so the output shaft 21 of the electric motor 20 is oriented in the front-rear direction of the vehicle, the electric motor 20 is prevented from protruding in the vehicle width direction, even when the electric motor 20 has a large size along the direction that the output shaft 21 of the electric motor 20 extends.

The primary speed-reducing mechanism 30 includes a case 31, a drive bevel gear 35, a driven bevel gear 36, a driveshaft 38, and a centrifugal clutch 60. The case 31 houses at least a portion of the output shaft 21 of the electric motor 20, the drive bevel gear 35, the driven bevel gear 36, the centrifugal clutch 60, and at least a portion of the driveshaft 38.

The output shaft 21 of the electric motor 20 has the drive bevel gear 35 attached thereto. Rotation of the output shaft 21 of the electric motor 20 is transmitted to the drive bevel gear 35, such that the drive bevel gear 35 rotates around the rotation axis 22 together with the output shaft 21.

The driven bevel gear 36 is disposed in the case 31 so as to rotate around a rotation axis 37 which is oriented in the vehicle width direction. The rotation axis 37 extends along a direction perpendicular or substantially perpendicular to the rotation axis 22. In this example, the driven bevel gear 36 is integral with the transmission shaft 51, which rotates around the rotation axis 37. Via a bearing 71, the transmission shaft 51 is supported by the case 31 so as to be capable of rotating. Although FIG. 2 illustrates the drive bevel gear 35 and the driven bevel gear 36 as spaced apart from each other (this being for ease of explaining the relative positioning between the drive bevel gear 35 and the driven bevel gear 36), the drive bevel gear 35 and the driven bevel gear 36 are actually meshed with each other.

Figure 4:
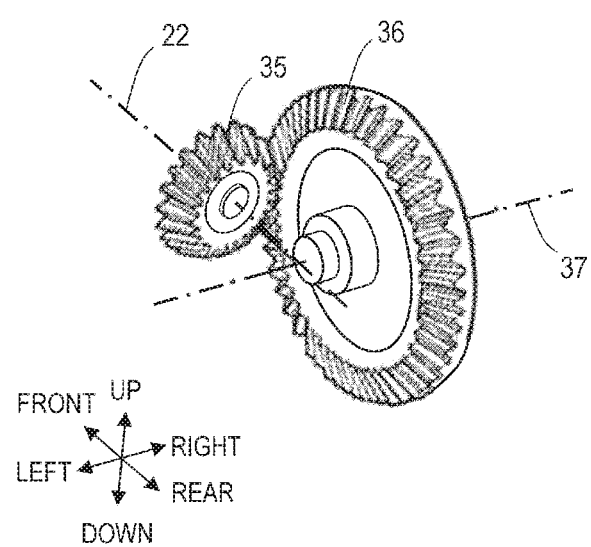
FIG. 4 is a perspective view showing a drive bevel gear and a driven bevel gear according to a preferred embodiment of the present invention.

FIG. 4 is a perspective view showing the drive bevel gear 35 and the driven bevel gear 36. Bevel gears, which are gears of frustum shapes with teeth provided on their side surface, allow rotational motion to be transmitted between two intersecting axes. The drive bevel gear 35 rotates around the rotation axis 22 which is oriented in the front-rear direction of the vehicle. The driven bevel gear 36 rotates around the rotation axis 37 which is oriented in the vehicle width direction. As the rotation of the drive bevel gear 35 is transmitted to the driven bevel gear 36, rotation around a rotation axis which is oriented in the front-rear direction of the vehicle is converted into rotation around a rotation axis which is oriented in the vehicle width direction.

The driven bevel gear 36 has more teeth than does the drive bevel gear 35. In the process during which the rotation of the drive bevel gear 35 is transmitted to the driven bevel gear 36, the rotation is decelerated. The drive bevel gear 35 and the driven bevel gear 36 alter the direction of rotation, and also define and function as a speed reducer to decelerate rotation.

At the left end of the transmission shaft 51 (FIG. 2), which rotates together with the driven bevel gear 36, the centrifugal clutch 60 is attached.

Figure 5:
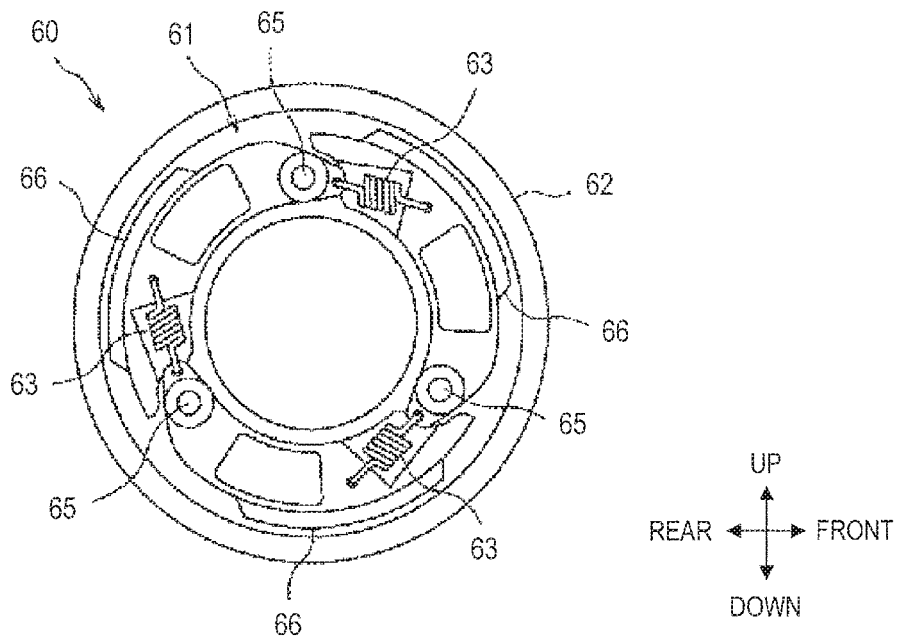
FIG. 5 is a diagram showing a state of a centrifugal clutch while an electric motor is stopped according to a preferred embodiment of the present invention.
Figure 6:
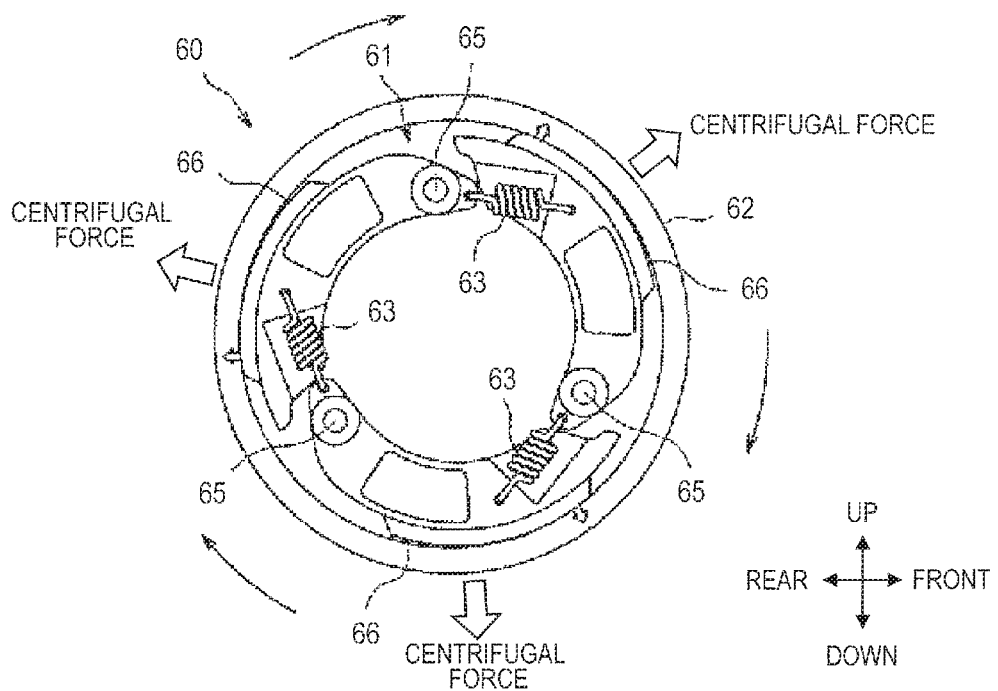
FIG. 6 is a diagram showing a state of a centrifugal clutch while an electric motor is being driven according to a preferred embodiment of the present invention.

FIG. 5 shows a state of the centrifugal clutch 60 while the electric motor 20 is stopped. FIG. 6 shows a state of the centrifugal clutch 60 while the electric motor 20 is being driven.

The centrifugal clutch 60 includes a clutch weight(s) 61 and a clutch outer cover 62. The clutch weight(s) 61 is attached at the left end of the transmission shaft 51 (FIG. 2). Pins 65 with which to mount clutch shoes 66 are provided for the clutch weight(s) 61. In the example shown in FIG. 5, three pins 65, for example, are attached at equal intervals along the circumferential direction. One end of each clutch shoe 66 is attached to a pin 65 that is attached to the clutch weight(s) 61, so as to permit pivoting. A clutch spring 63 links one end of one clutch shoe 66 to another end of a clutch shoe 66 that is adjacent to the one clutch shoe 66. Each clutch spring 63 exhibits an elastic force to pull together one end and the other end of adjacent clutch shoes 66. The clutch outer cover 62, which is a bowl-shaped member, covers over the clutch weight(s) 61. The clutch outer cover 62 is attached at the right end of the driveshaft 38 (FIG. 2).

While the electric motor 20 is stopped, as shown in FIG. 5, the clutch weight(s) 61 is reduced in diameter as a whole due to the elastic force of the clutch springs 63. As a result, the clutch shoes 66 and the clutch outer cover 62 are not in contact with each other.

As the electric motor 20 begins rotation, the transmission shaft 51 (FIG. 2) also begins to rotate. With an increase in the rotational speed of the transmission shaft 51, as shown in FIG. 6, a centrifugal force causes the clutch weight(s) 61 to overcome the elastic force of the clutch springs 63, such that the clutch weight(s) 61 expands in diameter as a whole. As a result, the clutch shoes 66 come in contact with the clutch outer cover 62. Due to the frictional force acting between the clutch shoes 66 and the clutch outer cover 62, the clutch weight(s) 61 and the clutch outer cover 62 become connected. As a result of this, rotation of the clutch weight(s) 61 is transmitted to the clutch outer cover 62. Rotation of the transmission shaft 51 is transmitted to the driveshaft 38 via the centrifugal clutch 60.

Via the bearing 71, the driveshaft 38 is supported by the case 31 so as to be capable of rotating. The driveshaft 38 rotates around the rotation axis 37. A seal 39 to prevent intrusion of water and dust is provided in a portion where the driveshaft 38 extends from the case 31 towards the exterior. At the left end of the driveshaft 38, the drive pulley 41 of the secondary speed-reducing mechanism 40 is attached. Rotation of the driveshaft 38 is transmitted to the drive pulley 41, such that the drive pulley 41 rotates around the rotation axis 37 together with the driveshaft 38. As a result, the rotation that has been decelerated by the primary speed-reducing mechanism 30 is transmitted to the secondary speed-reducing mechanism 40.

As shown in FIG. 1, the drive belt 43 is wrapped around the drive pulley 41 and the driven pulley 42. The driven pulley 42 is attached to the wheel shaft 44 of the rear wheel 4. The wheel shaft 44 of the rear wheel 4 is oriented in the vehicle width direction. The driven pulley 42 and the rear wheel 4 rotate around the rotation axis that is oriented in the vehicle width direction. Rotation of the drive pulley 41 is transmitted to the driven pulley 42 via the drive belt 43. Rotation of the driven pulley 42 is transmitted to the wheel shaft 44 of the rear wheel 4, such that the rear wheel 4 rotates together with the driven pulley 42. In this manner, rotation of the electric motor 20 is transmitted to the rear wheel 4, such that the two-wheeled electric vehicle 1 is able to travel.

In the present preferred embodiment, the electric motor 20 is disposed on the two-wheeled electric vehicle 1 so that the output shaft 21 is oriented in the front-rear direction of the vehicle. By using the drive bevel gear 35 and the driven bevel gear 36, the rotation generated by the electric motor 20 is converted into rotation around a rotation axis which is oriented in the vehicle width direction. By orienting the rotation axis in the vehicle width direction, even in the case in which a gear with a large number of teeth and a large diameter is provided in the primary speed-reducing mechanism 30, the size of the primary speed-reducing mechanism 30 along the vehicle width direction is reduced. In the example shown in FIG. 2, the driven bevel gear 36 has a large number of teeth and a large diameter. However, the driven bevel gear 36 is disposed so as to rotate around the rotation axis 37 which is oriented in the vehicle width direction. Since the radial direction of the driven bevel gear 36 is not oriented in the vehicle width direction, the bevel gear 36 having a large diameter does not affect the vehicle width direction. Therefore, the size of the primary speed-reducing mechanism 30 along the vehicle width direction is reduced.

Moreover, by orienting the rotation axis direction of the rotation which is output from the primary speed-reducing mechanism 30 in the vehicle width direction, it is possible to use the belt-drive type secondary speed-reducing mechanism 40. In the case in which a secondary speed-reducing mechanism of a shaft-drive type is used, it is necessary to use a propeller shaft and bevel gears in the secondary speed-reducing mechanism, freedom in the layout of the electric motor, the primary speed-reducing mechanism, and the secondary speed-reducing mechanism is reduced. In the present preferred embodiment, it is possible to use the belt-drive type secondary speed-reducing mechanism 40, thus improving the freedom in the layout of the electric motor 20, the primary speed-reducing mechanism 30, and the secondary speed-reducing mechanism 40. In the case in which a secondary speed-reducing mechanism of a shaft-drive type is used, as described above, a set consisting of a primary speed-reducing mechanism and a secondary speed-reducing mechanism needs to be developed for each individual model of a two-wheeled electric vehicle. This results in the problem of increased development costs for the two-wheeled electric vehicle. On the other hand, according to the present preferred embodiment, it is possible to use the same electric motor 20 and primary speed-reducing mechanism 30 commonly for a plurality of types of vehicle models through mere adjustments of the respective sizes of the drive pulley 41, the drive belt 43, and the driven pulley 42, thus reducing development costs.

The primary speed-reducing mechanism 30 according to the present preferred embodiment includes the centrifugal clutch 60. The centrifugal clutch 60 is disposed in the transmission path of motive power between the electric motor 20 and the drive pulley 41. In the example shown in FIG. 2, the centrifugal clutch 60 is disposed in the transmission path of motive power between the driven bevel gear 36 and the drive pulley 41.

A user of the two-wheeled electric vehicle 1 may push the two-wheeled electric vehicle 1. When pushing the two-wheeled electric vehicle 1, if the drive wheel 4 and the electric motor 20 are mechanically connected, the user needs to exert extra force on the vehicle to rotate the electric motor 20. As a result, the user needs to push the vehicle with a large force. In the present preferred embodiment, while the electric motor 20 is not being driven, the centrifugal clutch 60 causes the drive wheel 4 and the electric motor 20 to be mechanically disconnected. As a result, the user is able to push the vehicle with little force.

In the example shown in FIG. 2, while the electric motor 20 is not being driven, the centrifugal clutch 60 causes the drive wheel 4 and the driven bevel gear 36 to be mechanically disconnected. When pushing the two-wheeled electric vehicle 1, it is not necessary to apply a load to cause rotation of the electric motor 20, the drive bevel gear 35, and the driven bevel gear 36, such that the user is able to push the two-wheeled electric vehicle 1 with less force.

Moreover, in the example shown in FIG. 2, the centrifugal clutch 60 and the driven bevel gear 36 rotate around the same rotation axis 37. If the rotation axis of the centrifugal clutch 60 and the rotation axis of the driven bevel gear 36 are shifted along the front-rear direction of the vehicle, the shift causes a corresponding increase in the size of the primary speed-reducing mechanism 30 in the front-rear direction of the vehicle. In the example shown in FIG. 2, the centrifugal clutch 60 and the driven bevel gear 36 rotate around the same rotation axis as a center, rather than around different rotation axes. This reduces the size of the primary speed-reducing mechanism 30, including the centrifugal clutch 60, in the front-rear direction of the vehicle.

Elements of the primary speed-reducing mechanism 30 according to the present preferred embodiment are housed in the case 31. The space within the case 31 is divided into a bevel-gear space 33, which accommodates the drive bevel gear 35 and the driven bevel gear 36, and a centrifugal-clutch space 34, which accommodates the centrifugal clutch 60. The bevel-gear space 33 and the centrifugal-clutch space 34 are separated from each other by the wall 32. The bevel gears 35 and 36 and the centrifugal clutch 60 require respectively different kinds and/or amounts of lubricant. Therefore, the bevel gears 35 and 36 and the centrifugal clutch 60 are accommodated in different spaces which are separated by the wall 32. This prevents the lubricant for one of the bevel gears 35 and 36 and the centrifugal clutch 60 from adhering to the other.

As shown in FIG. 3, the electric motor 20 overlaps the vehicle center line 14 in a plan view of the vehicle. More specifically, the output shaft 21 of the electric motor 20 overlaps the vehicle center line 14 in a plan view of the vehicle. The vehicle center line 14 is a line which passes through the vehicle center in the vehicle width direction and extends along the front-rear direction of the vehicle. By disposing the electric motor 20, which is a heavy object, near the center in the vehicle width direction, the two-wheeled electric vehicle 1 is provided with a good weight balance.

Moreover, in a plan view of the vehicle, given a left region LA and a right region RA that are divided at the vehicle center line 14, the driven bevel gear 36 is disposed in the right region RA. On the other hand, the drive pulley 41 is disposed in the left region LA.

If both of the driven bevel gear 36 and the drive pulley 41 were disposed in one of the left region LA and the right region RA of the two-wheeled electric vehicle 1, e.g., the left region LA, the left region LA of the two-wheeled electric vehicle 1 would have a large size. In order to reduce the size of the left region LA, the position of the electric motor 20 might have to be shifted to the right region RA, for example. By disposing the driven bevel gear 36 in one of the left region LA and the right region RA, and disposing the drive pulley 41 in the other, it becomes possible to dispose the electric motor 20 near the center along the vehicle width direction. While keeping the size of the primary speed-reducing mechanism 30 along the vehicle width direction small, the two-wheeled electric vehicle 1 is provided with a good weight balance.

Note that the secondary speed-reducing mechanism 40 may transmit rotation by using sprockets and a chain. In the present specification, the phrase "pulleys and a belt" encompasses sprockets and a chain.

Figure 7:
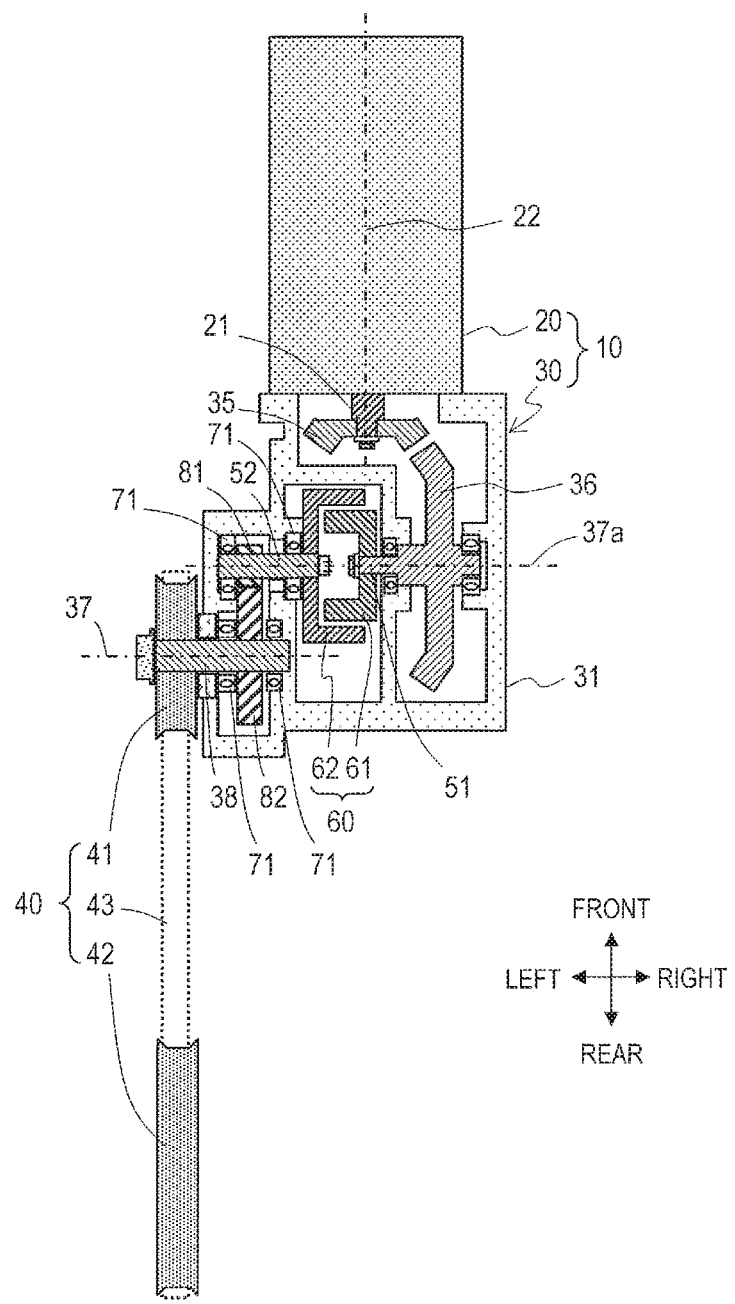
FIG. 7 is a cross-sectional view showing another example of a primary speed-reducing mechanism according to a preferred embodiment of the present invention.

Next, another example of the primary speed-reducing mechanism 30 will be described. FIG. 7 is a cross-sectional view showing another example of the primary speed-reducing mechanism 30 according to a preferred embodiment of the present invention.

In the example shown in FIG. 7, as a speed reducer, the primary speed-reducing mechanism 30 includes gears 81 and 82. The gears 81 and 82 are disposed in the transmission path of motive power between the electric motor 20 and the drive pulley 41. For example, the gears 81 and 82 may be disposed in the transmission path of motive power between the driven bevel gear 36 and the drive pulley 41. In the example shown in FIG. 7, the gears 81 and 82 are disposed in the transmission path of motive power between the centrifugal clutch 60 and the drive pulley 41.

The driven bevel gear 36 and the centrifugal clutch 60 are disposed in the case 31 so as to rotate around a rotation axis 37a which is oriented in the vehicle width direction. The clutch outer cover 62 of the centrifugal clutch 60 is attached at the right end of the transmission shaft 52. Via the bearing 71, the transmission shaft 52 is supported by the case 31 so as to be capable of rotating. The transmission shaft 52 rotates around the rotation axis 37a.

The driveshaft 38 rotates around the rotation axis 37. The rotation axis 37 is located more to the rear of the vehicle than is the rotation axis 37a. The transmission shaft 52 includes the gear 81 attached thereto. The gear 81 rotates around the rotation axis 37a together with the transmission shaft 52. The driveshaft 38 includes the gear 82 attached thereto. The gear 82 rotates around the rotation axis 37 together with the driveshaft 38. For example, the gears 81 and 82 may be cylindrical gears, e.g., as spur gears, helical gears, and so on.

The gear 81 and the gear 82 are meshed with each other such that rotation of the transmission shaft 52 is transmitted to the driveshaft 38 via the gears 81 and 82. The gear 82 has more teeth than does the gear 81. In the process during which the rotation of the gear 81 is transmitted to the gear 82, the rotation is decelerated. The decelerated rotation is transmitted to the drive pulley 41 via the driveshaft 38. The drive pulley 41 rotates around the rotation axis 37 together with the driveshaft 38. As a result, the rotation speed that has been decelerated by the primary speed-reducing mechanism 30 is transmitted to the secondary speed-reducing mechanism 40.

As a speed reducer, the primary speed-reducing mechanism 30 shown in FIG. 7 includes gears 81 and 82. This allows the primary speed-reducing mechanism 30 to output a significantly decelerated rotation. By significantly decelerating the rotation at the primary speed-reducing mechanism 30, sufficient torque is obtained even if the deceleration ratio in the secondary speed-reducing mechanism 40 is small. This allows the size of the driven pulley 42 to be small.

The rotation axes of the gears 81 and 82 used as a speed reducer are oriented in the vehicle width direction. This allows the size of the speed reducer along the vehicle width direction to be reduced.

As has been described with reference to FIG. 3, the output shaft 21 of the electric motor 20 overlaps the vehicle center line 14 in a plan view of the vehicle. In other words, the rotation axis 22 of the electric motor 20 shown in FIG. 7 overlaps the vehicle center line 14 in a plan view of the vehicle. In a plan view of the vehicle, given a left region LA and a right region RA that are divided at the vehicle center line 14, the driven bevel gear 36 is disposed in the right region RA. On the other hand, the gears 81 and 82 are disposed in the left region LA.

If both of the driven bevel gear 36 and the gears 81 and 82 were disposed in one of the left region LA and the right region RA, e.g., the left region LA, the left region LA of the vehicle would have a large size. In order to reduce the size of the left region LA, the position of the electric motor 20 might have to be shifted to the right region RA, for example. By disposing the driven bevel gear 36 in one of the left region LA and the right region RA, and disposing the gears 81 and 82 in the other, it becomes possible to dispose the electric motor 20 near the center along the vehicle width direction. While keeping the size of the primary speed-reducing mechanism 30 along the vehicle width direction small, the two-wheeled electric vehicle 1 is provided with a good weight balance.

Figure 8:
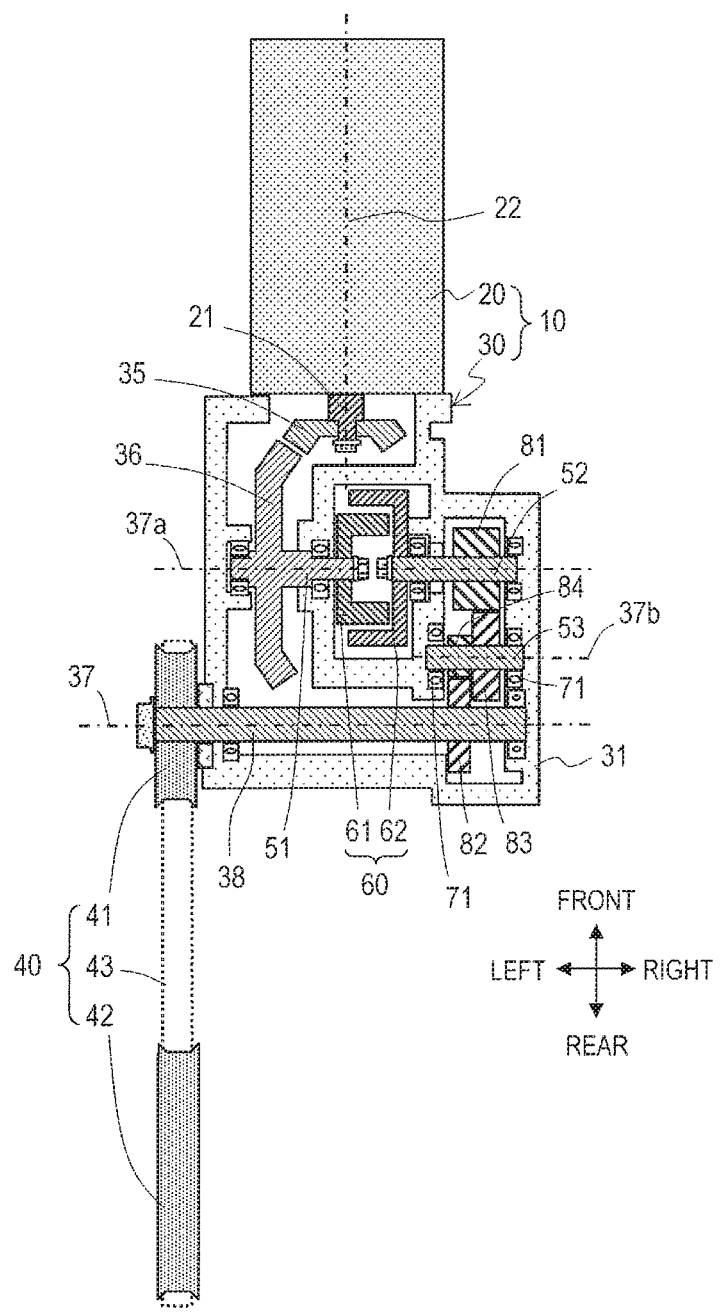
FIG. 8 is a cross-sectional view showing still another example of a primary speed-reducing mechanism according to a preferred embodiment of the present invention.

Next, still another example of the primary speed-reducing mechanism 30 will be described. FIG. 8 is a cross-sectional view showing still another example of the primary speed-reducing mechanism 30 according to a preferred embodiment of the present invention.

In the example shown in FIG. 8, as a speed reducer, the primary speed-reducing mechanism 30 includes gears 81, 82, 83 and 84. The gears 81, 82, 83 and 84 may be, for example, cylindrical gears, e.g., spur gears, helical gears, and so on. The gears 83 and 84 are attached to the transmission shaft 53. Via a bearing 71, the transmission shaft 53 is supported by the case 31 so as to be capable of rotating. The transmission shaft 53 rotates around a rotation axis 37b which is oriented in the vehicle width direction. Regarding the front-rear direction of the vehicle, the rotation axis 37b is located between the rotation axis 37a and the rotation axis 37.

The gear 81 and the gear 83 are meshed with each other such that rotation of the transmission shaft 52 is transmitted to the transmission shaft 53 via the gears 81 and 83. The gear 83 has more teeth than does the gear 81. In the process during which the rotation of the gear 81 is transmitted to the gear 83, the rotation is decelerated. The gear 84 attached to the transmission shaft 53 rotates together with the transmission shaft 53 and the gear 83.

The gear 84 and the gear 82 are meshed with each other such that rotation of the transmission shaft 53 is transmitted to the driveshaft 38 via the gears 84 and 82. The gear 82 has more teeth than does the gear 84. In the process during which the rotation of the gear 84 is transmitted to the gear 82, the rotation is further decelerated.

The decelerated rotation is transmitted to the drive pulley 41 via the driveshaft 38. The drive pulley 41 rotates around the rotation axis 37 together with the driveshaft 38. As a result, the rotation that has been decelerated by the primary speed-reducing mechanism 30 is transmitted to the secondary speed-reducing mechanism 40.

As a speed reducer, the primary speed-reducing mechanism 30 shown in FIG. 8 includes gears 81, 82, 83 and 84. This allows the primary speed-reducing mechanism 30 to output a significantly decelerated rotation. By significantly decelerating the rotation at the primary speed-reducing mechanism 30, sufficient torque is obtained even if the deceleration ratio in the secondary speed-reducing mechanism 40 is small. This allows the size of the driven pulley 42 to be small.

The rotation axes of the gears 81, 82, 83 and 84 used as a speed reducer are oriented in the vehicle width direction. This allows the size of the speed reducer in the vehicle width direction to be reduced.

As has been described with reference to FIG. 3, the output shaft 21 of the electric motor 20 overlaps the vehicle center line 14 in a plan view of the vehicle. In other words, the rotation axis 22 of the electric motor 20 shown in FIG. 8 overlaps the vehicle center line 14 in a plan view of the vehicle. In a plan view of the vehicle, given a left region LA and a right region RA that are divided at the vehicle center line 14, the driven bevel gear 36 is disposed in the left region LA. On the other hand, the gears 81, 82, 83 and 84 are disposed in the right region RA. By disposing the driven bevel gear 36 in one of the left region LA and the right region RA, and disposing the gears 81, 82, 83 and 84 in the other, it becomes possible to dispose the electric motor 20 near the center along the vehicle width direction. While keeping the size of the primary speed-reducing mechanism 30 along the vehicle width direction small, the two-wheeled electric vehicle 1 is provided with a good weight balance.

Figure 9:
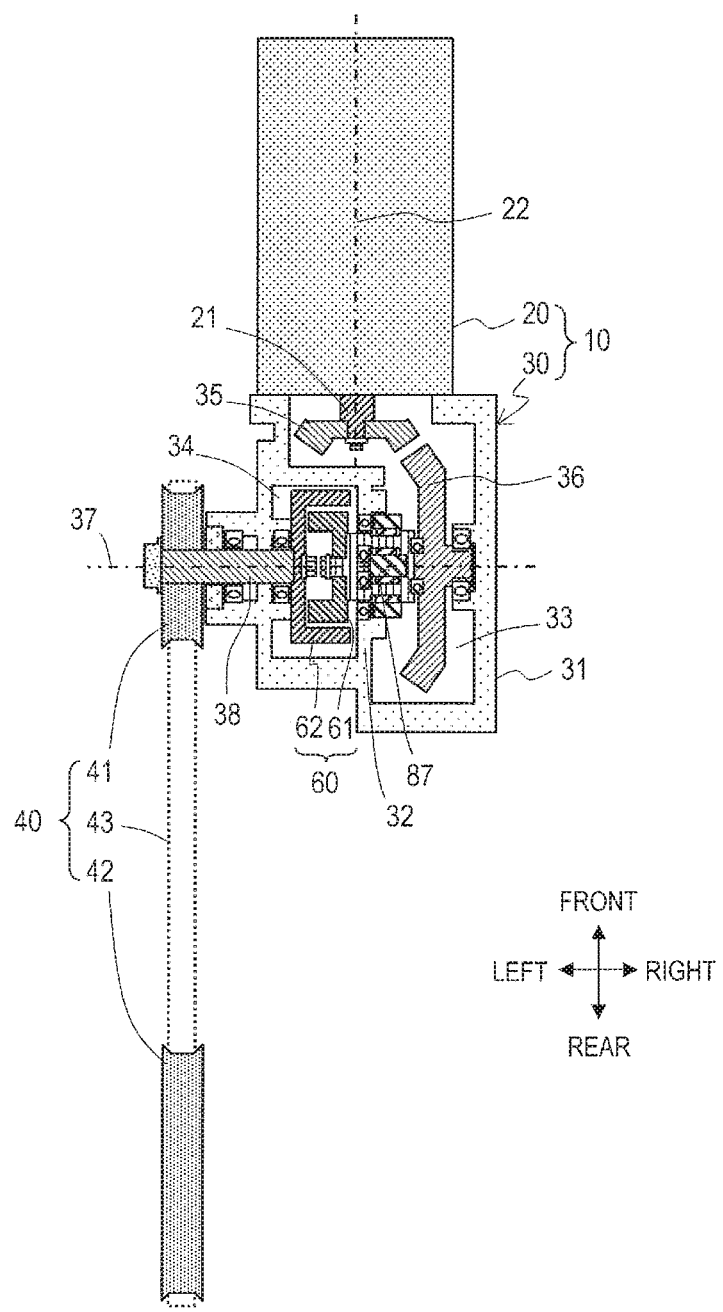
FIG. 9 is a cross-sectional view showing still another example of a primary speed-reducing mechanism according to a preferred embodiment of the present invention.

Next, still another example of the primary speed-reducing mechanism 30 will be described. FIG. 9 is a cross-sectional view showing still another example of the primary speed-reducing mechanism 30 according to a preferred embodiment of the present invention.

In the example shown in FIG. 9, the primary speed-reducing mechanism 30 includes a planet gear mechanism 87 as a speed reducer. In this example, the planet gear mechanism 87 is provided between the driven bevel gear 36 and the centrifugal clutch 60. The planet gear mechanism 87 allows the input shaft and the output shaft to be disposed coaxially. Therefore, using the planet gear mechanism 87 as a speed reducer allows the size of the speed reducer to be reduced.

Rotation of the driven bevel gear 36 is transmitted to the planet gear mechanism 87, where it is decelerated. The rotation that has been decelerated by planet gear mechanism 87 is transmitted to the clutch weight(s) 61 of the centrifugal clutch 60. The input shaft and output shaft of the planet gear mechanism 87 rotate around the rotation axis 37. The planet gear mechanism 87 defining a speed reducer, the driven bevel gear 36, the centrifugal clutch 60, and the driveshaft 38 rotate around the same rotation axis 37 as a center. This allows the size of the primary speed-reducing mechanism 30 to be reduced.

The planet gear mechanism 87 defining a speed reducer is accommodated in the bevel-gear space 33 together with the driven bevel gear 36. By placing elements requiring large amounts of lubricant in one space, the number of walls in the case 31 is able to be reduced, thus reducing the size of the primary speed-reducing mechanism 30.

As a speed reducer, the primary speed-reducing mechanism 30 shown in FIG. 9 includes the planet gear mechanism 87. This allows the primary speed-reducing mechanism 30 to output significantly decelerated rotation. By significantly decelerating the rotation at the primary speed-reducing mechanism 30, sufficient torque is obtained even if the deceleration ratio in the secondary speed-reducing mechanism 40 is small. This allows the size of the driven pulley 42 to be small.

Figure 10:
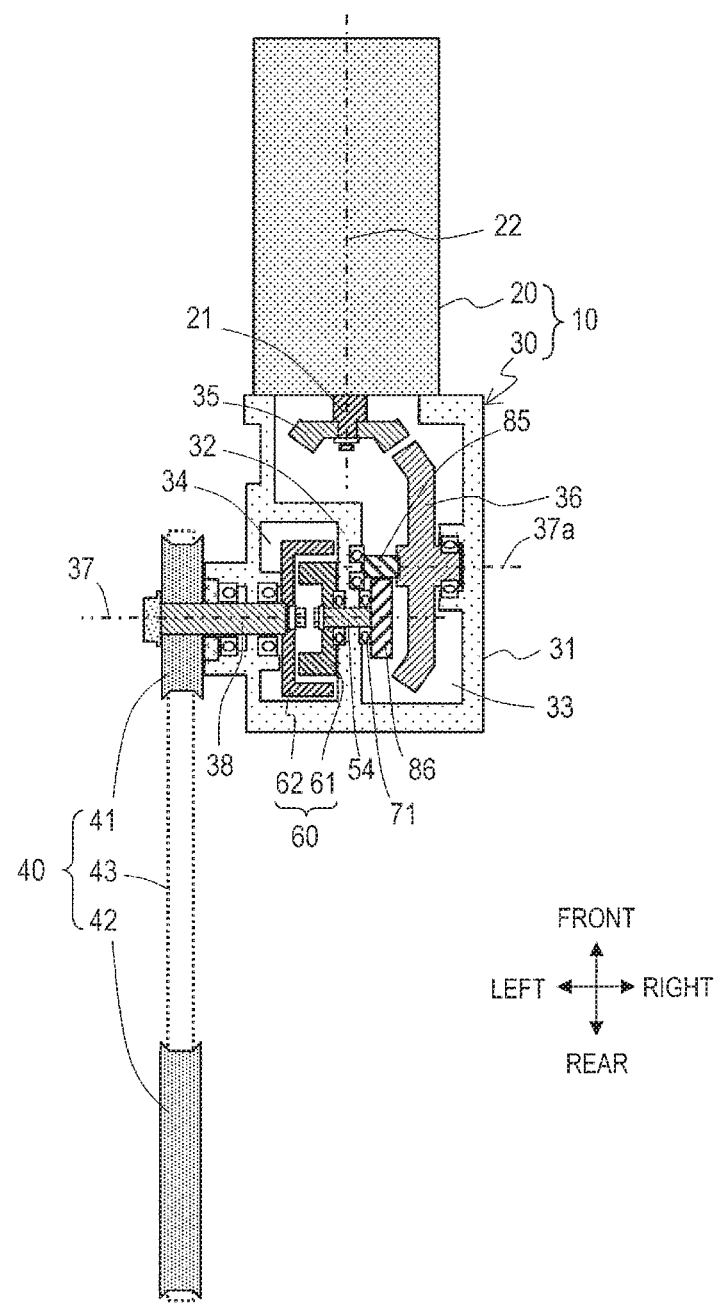
FIG. 10 is a cross-sectional view showing still another example of a primary speed-reducing mechanism according to a preferred embodiment of the present invention.

Next, still another example of the primary speed-reducing mechanism 30 will be described. FIG. 10 is a cross-sectional view showing still another example of the primary speed-reducing mechanism 30 according to a preferred embodiment of the present invention.

In the example shown in FIG. 10, as a speed reducer, the primary speed-reducing mechanism 30 includes gears 85 and 86. The gears 85 and 86 may be, for example, cylindrical gears, e.g., spur gears, helical gears, and so on. The gear 85 is attached to the driven bevel gear 36, and rotates around the rotation axis 37a, together with the driven bevel gear 36. Via a bearing 71, the transmission shaft 54 is supported by the case 31 so as to be capable of rotating. The transmission shaft 54 rotates around the rotation axis 37. The gear 86, which is attached to the transmission shaft 54, rotates around the rotation axis 37 together with the transmission shaft 54. The clutch weight(s) 61 of the centrifugal clutch 60 is attached at the left end of the transmission shaft 54.

The gear 85 and the gear 86 are meshed with each other such that rotation of the driven bevel gear 36 is transmitted to the transmission shaft 54 via the gears 85 and 86. The gear 86 has more teeth than does the gear 85. In the process during which the rotation of the gear 85 is transmitted to the gear 86, the rotation is decelerated. The decelerated rotation is transmitted to the drive pulley 41 via the centrifugal clutch 60 and the driveshaft 38. The drive pulley 41 rotates around the rotation axis 37 together with the driveshaft 38. As a result, the rotation that has been decelerated by the primary speed-reducing mechanism 30 is transmitted to the secondary speed-reducing mechanism 40.

As a speed reducer, the primary speed-reducing mechanism 30 shown in FIG. 10 includes gears 85 and 86. This allows the primary speed-reducing mechanism 30 to output significantly decelerated rotation. By significantly decelerating the rotation at the primary speed-reducing mechanism 30, sufficient torque is obtained even if the deceleration ratio in the secondary speed-reducing mechanism 40 is small. This allows the size of the driven pulley 42 to be small.

The rotation axes of the gears 85 and 86 used as a speed reducer are oriented in the vehicle width direction. This allows the size of the speed reducer along the vehicle width direction to be reduced.

The gears 85 and 86 defining a speed reducer are accommodated in the bevel-gear space 33 together with the driven bevel gear 36. By placing elements requiring large amounts of lubricant in one space, the number of walls in the case 31 is able to be reduced, thus reducing the size of the primary speed-reducing mechanism 30.

Figure 11:
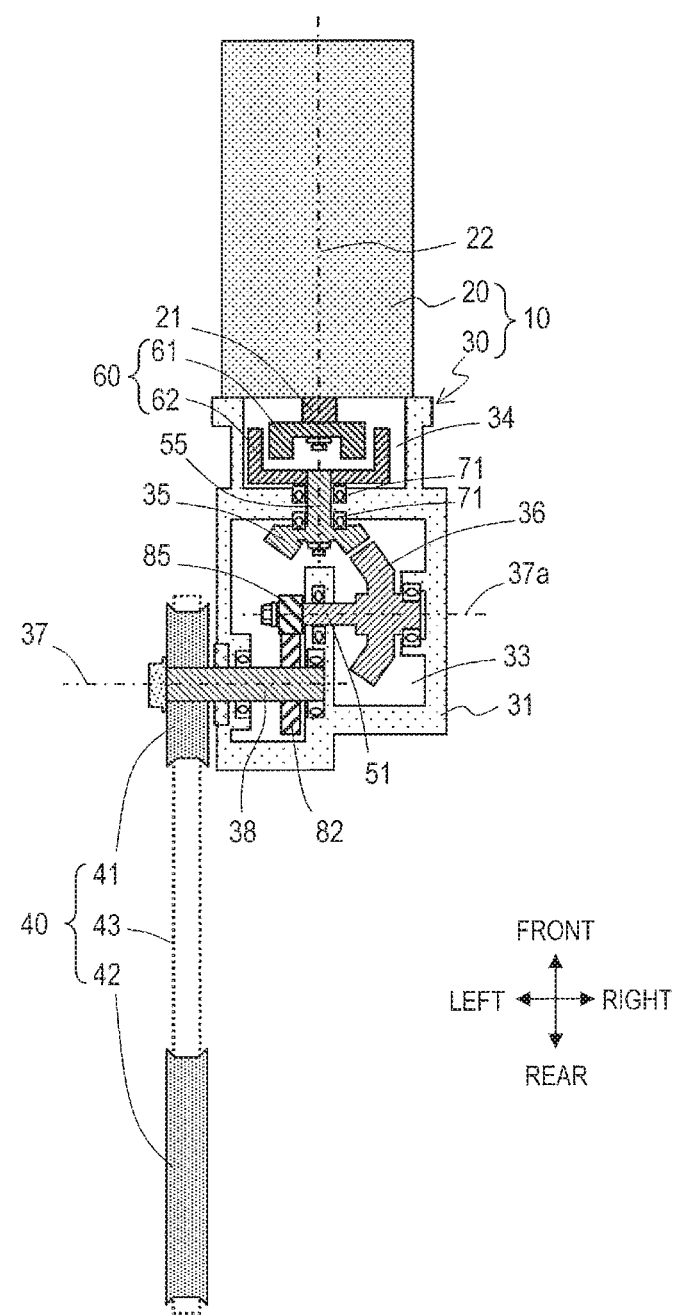
FIG. 11 is a cross-sectional view showing still another example of a primary speed-reducing mechanism according to a preferred embodiment of the present invention.

Next, still another example of the primary speed-reducing mechanism 30 will be described. FIG. 11 is a cross-sectional view showing still another example of the primary speed-reducing mechanism 30 according to a preferred embodiment of the present invention.

In the example shown in FIG. 11, the centrifugal clutch 60 is disposed in the transmission path of motive power between the electric motor 20 and the drive bevel gear 35. The clutch weight(s) 61 of the centrifugal clutch 60 is attached to the output shaft 21 of the electric motor 20. In this example, the drive bevel gear 35 is integral with the transmission shaft 55, which rotates around a rotation axis 22 that is oriented in the front-rear direction of the vehicle. The clutch outer cover 62 of the centrifugal clutch 60 is attached at the front end of the transmission shaft 55.

The driven bevel gear 36 and the transmission shaft 51 are disposed in the case 31 so as to rotate around the rotation axis 37a. The gear 85 is attached to the transmission shaft 51, and rotates around the rotation axis 37a, together with the driven bevel gear 36. The driveshaft 38 includes the gear 82 attached thereto. The gear 82 rotates around the rotation axis 37 together with the driveshaft 38.

The gear 85 and the gear 82 are meshed with each other such that rotation of the driven bevel gear 36 is transmitted to the driveshaft 38 via the gears 85 and 82. The gear 82 has more teeth than does the gear 85. In the process during which the rotation of the gear 85 is transmitted to the gear 82, the rotation is decelerated. The decelerated rotation is transmitted to the drive pulley 41 via the driveshaft 38. The drive pulley 41 rotates around the rotation axis 37 together with the driveshaft 38. As a result, the rotation that has been decelerated by the primary speed-reducing mechanism 30 is transmitted to the secondary speed-reducing mechanism 40.

In the example shown in FIG. 11, rotation of the output shaft 21 of the electric motor 20 is directly transmitted to the centrifugal clutch 60. The rotation before being decelerated by the drive bevel gear 35 and the driven bevel gear 36 is transmitted to the centrifugal clutch 60. Therefore, even while the electric motor 20 is rotating at a low speed, the centrifugal clutch 60 is able to easily engage. Moreover, the rotation before undergoing an increase in torque by the drive bevel gear 35 and the driven bevel gear 36 is transmitted to the centrifugal clutch 60. As a result, the load on the centrifugal clutch 60 is reduced.

The centrifugal clutch 60 and the output shaft 21 of the electric motor 20 rotate around the same rotation axis 22 as a center. If the rotation axis of the centrifugal clutch 60 and the rotation axis of the output shaft 21 are shifted along the vehicle width direction, the shift causes a corresponding increase in the size of the primary speed-reducing mechanism 30 in the vehicle width direction. In the example shown in FIG. 11, the centrifugal clutch 60 and the output shaft 21 rotate around the same rotation axis as a center, rather than around different rotation axes. This allows a reduction in the size of the primary speed-reducing mechanism 30, including the centrifugal clutch 60, in the vehicle width direction.

As a speed reducer, the primary speed-reducing mechanism 30 shown in FIG. 11 includes gears 85 and 82. This allows the primary speed-reducing mechanism 30 to output a significantly decelerated rotation. By significantly decelerating the rotation at the primary speed-reducing mechanism 30, sufficient torque is obtained even if the deceleration ratio in the secondary speed-reducing mechanism 40 is small. This allows the size of the driven pulley 42 to be small.

The rotation axes of the speed reducer using gears 85 and 82 are oriented in the vehicle width direction. This allows the size of the speed reducer along the vehicle width direction to be reduced.

The gears 85 and 82 defining a speed reducer are accommodated in the bevel-gear space 33 together with the driven bevel gear 36. By placing elements requiring large amounts of lubricant in one space, the number of walls in the case 31 is able to be reduced, thus reducing the size of the primary speed-reducing mechanism 30.

Figure 12:
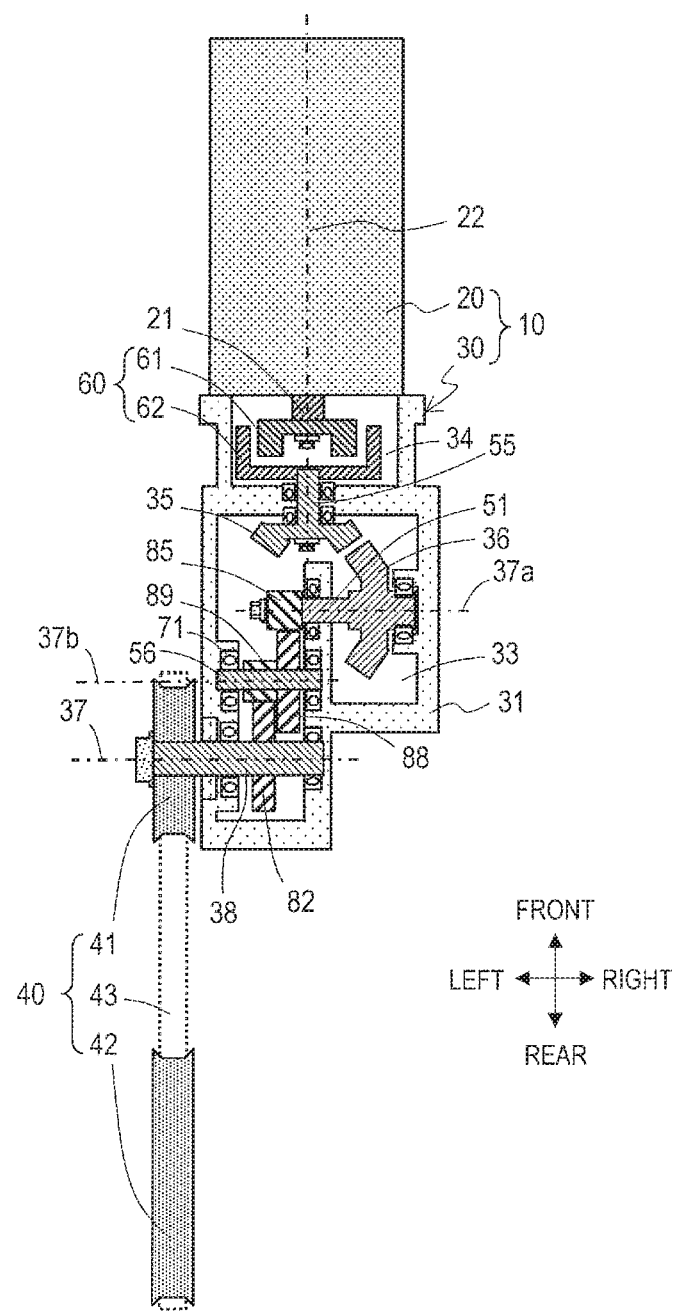
FIG. 12 is a cross-sectional view showing still another example of a primary speed-reducing mechanism according to a preferred embodiment of the present invention.

Next, still another example of the primary speed-reducing mechanism 30 will be described. FIG. 12 is a cross-sectional view showing still another example of the primary speed-reducing mechanism 30 according to a preferred embodiment of the present invention.

In the example shown in FIG. 12, the centrifugal clutch 60 is disposed in the transmission path of motive power between the electric motor 20 and the drive bevel gear 35. The driven bevel gear 36 and the transmission shaft 51 rotate around the rotation axis 37a. The gear 85 is attached to the transmission shaft 51, and rotates around the rotation axis 37a together with the driven bevel gear 36.

Gears 88 and 89 are attached to the transmission shaft 56. The gears 88 and 89 may be, for example, cylindrical gears, e.g., spur gears, helical gears, and so on. The transmission shaft 56 is supported by the case 31, via a bearing 71, so as to be capable of rotating. The transmission shaft 56 rotates around a rotation axis 37b which is oriented in the vehicle width direction. Regarding the front-rear direction of the vehicle, the rotation axis 37b is located between the rotation axis 37a and the rotation axis 37.

The gear 85 and the gear 88 are meshed with each other such that rotation of the transmission shaft 51 is transmitted to the transmission shaft 56 via the gears 85 and 88. The gear 88 has more teeth than does the gear 85. In the process during which the rotation of the gear 85 is transmitted to the gear 88, the rotation is decelerated. The gear 89 attached to the transmission shaft 56 rotates together with the transmission shaft 56 and the gear 88.

The gear 89 and the gear 82 are meshed with each other such that rotation of the transmission shaft 56 is transmitted to the driveshaft 38 via the gears 89 and 82. The gear 82 has more teeth than does the gear 89. In the process during which the rotation of the gear 89 is transmitted to the gear 82, the rotation is further decelerated.

The decelerated rotation is transmitted to the drive pulley 41 via the driveshaft 38. The drive pulley 41 rotates around the rotation axis 37 together with the driveshaft 38. As a result, the rotation that has been decelerated by the primary speed-reducing mechanism 30 is transmitted to the secondary speed-reducing mechanism 40.

In the example shown in FIG. 12, rotation of the output shaft 21 of the electric motor 20 is directly transmitted to the centrifugal clutch 60. The rotation before being decelerated by the drive bevel gear 35 and the driven bevel gear 36 is transmitted to the centrifugal clutch 60. Therefore, even while the electric motor 20 is rotating at a low speed, the centrifugal clutch 60 is able to easily engage. Moreover, the rotation before undergoing an increase in torque by the drive bevel gear 35 and the driven bevel gear 36 is transmitted to the centrifugal clutch 60. As a result, the load on the centrifugal clutch 60 is reduced.

The centrifugal clutch 60 and the output shaft 21 of the electric motor 20 rotate around the same rotation axis 22 as a center. This allows the size of the primary speed-reducing mechanism 30 along the vehicle width direction, including the centrifugal clutch 60, to be reduced.

As a speed reducer, the primary speed-reducing mechanism 30 shown in FIG. 12 includes gears 85, 88, 89 and 82. This allows the primary speed-reducing mechanism 30 to output a significantly decelerated rotation. By significantly decelerating the rotation at the primary speed-reducing mechanism 30, sufficient torque is obtained even if the deceleration ratio in the secondary speed-reducing mechanism 40 is small. This allows the size of the driven pulley 42 to be small.

The rotation axes of the gears 85, 88, 89 and 82 used as a speed reducer are oriented in the vehicle width direction. This allows the size of the speed reducer along the vehicle width direction to be reduced.

The gears 85, 88, 89 and 82 defining the speed reducer are accommodated in the bevel-gear space 33 together with the driven bevel gear 36. By placing elements requiring large amounts of lubricant in one space, the number of walls in the case 31 is able to be reduced, thus reducing the size of the primary speed-reducing mechanism 30.

Figure 13:
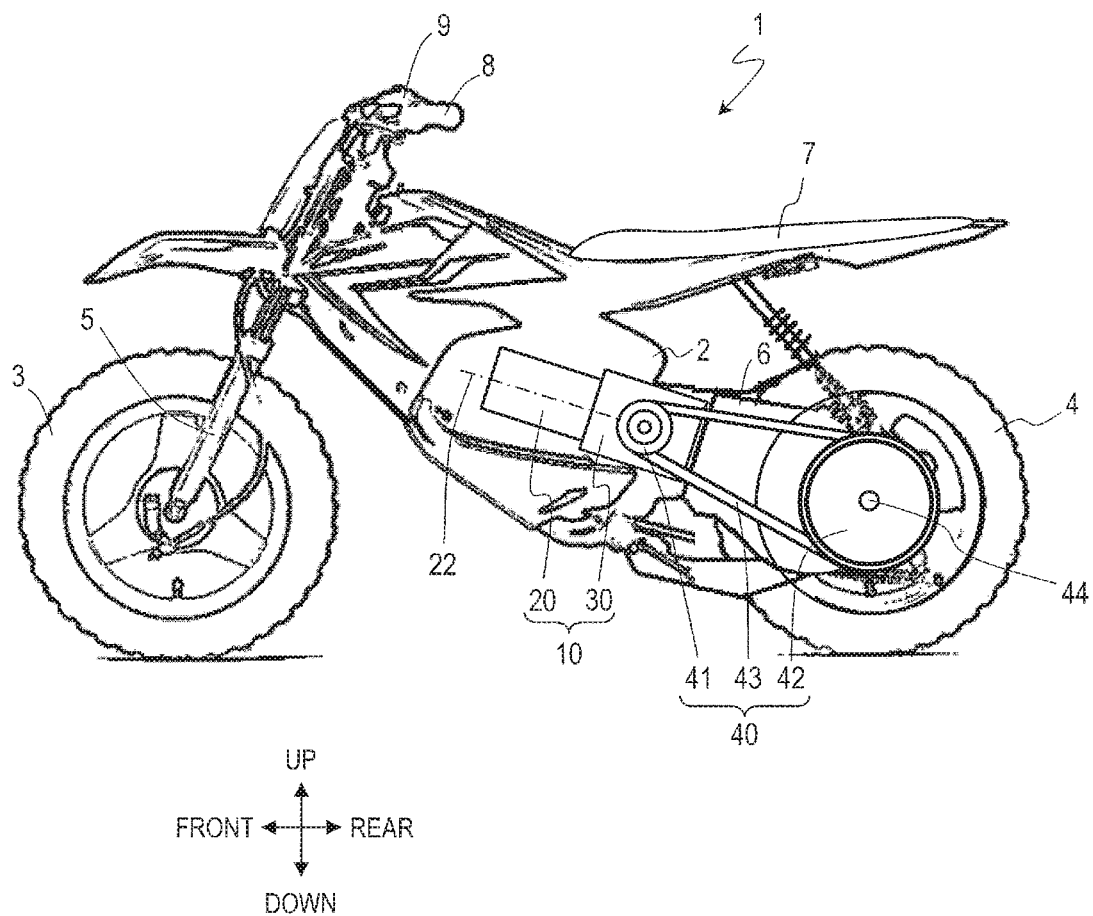
FIG. 13 is a side view showing another example of a two-wheeled electric vehicle according to a preferred embodiment of the present invention.

The electric power unit 10 according to the present preferred embodiment is disposed on the two-wheeled electric vehicle 1 so that the output shaft 21 of the electric motor 20 is oriented in a direction perpendicular or substantially perpendicular to the vehicle width direction. In other words, the rotation axis 22 of the electric motor 20 is oriented in a direction perpendicular or substantially perpendicular to the vehicle width direction. In the above-described examples, the rotation axis 22 of the electric motor 20 is oriented in the front-rear direction of the vehicle. The rotation axis 22 of the electric motor 20 may be oriented in a direction other than horizontal in the front-rear direction. FIG. 13 is a side view showing another example of a two-wheeled electric vehicle 1 according to a preferred embodiment of the present invention. In the example shown in FIG. 13, the two-wheeled electric vehicle 1 is a two-wheeled electric vehicle of an off-road type. In a side view of the two-wheeled electric vehicle 1, the rotation axis 22 of the electric motor 20 is oriented in an oblique direction.

Figure 14:
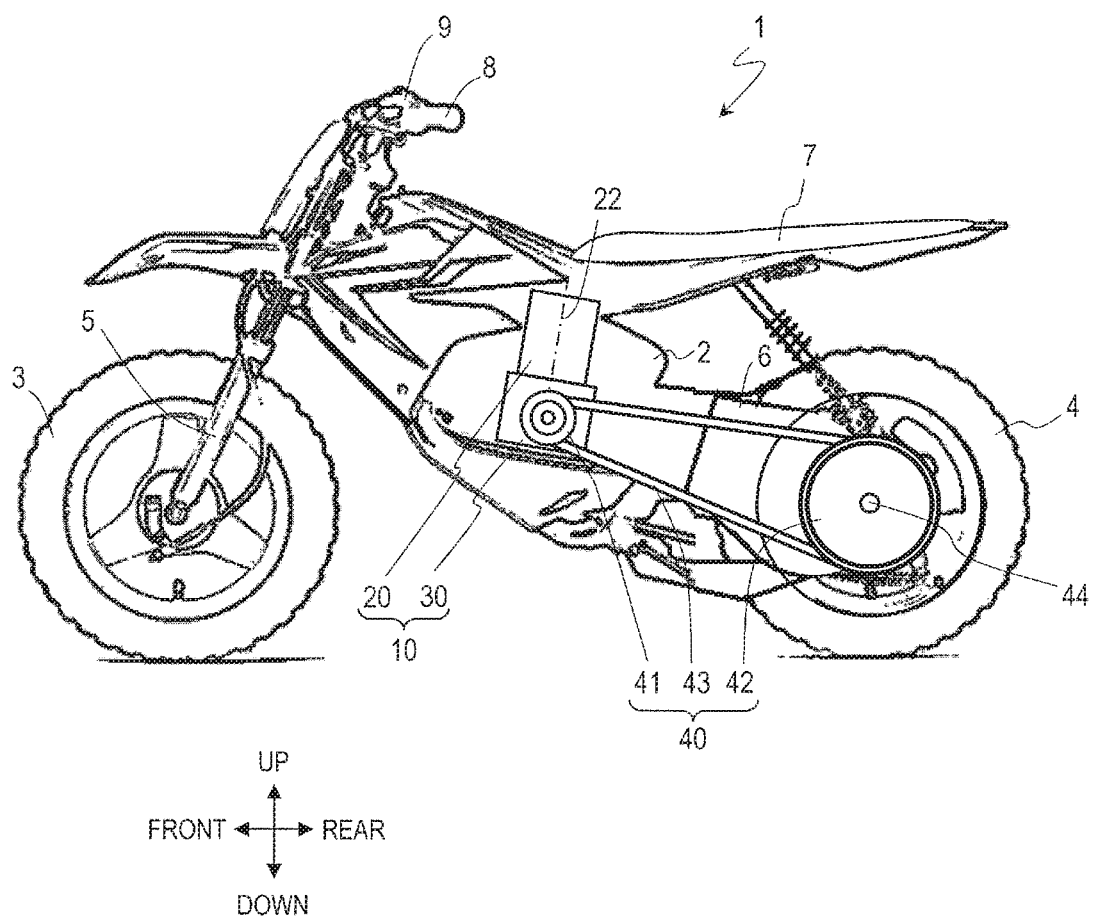
FIG. 14 is a side view showing still another example of a two-wheeled electric vehicle according to a preferred embodiment of the present invention.

Alternatively, the rotation axis 22 of the electric motor 20 may be oriented in the up-down direction. FIG. 14 is a side view showing still another example of a two-wheeled electric vehicle 1 according to a preferred embodiment of the present invention. In the example shown in FIG. 14, in a side view of the two-wheeled electric vehicle 1, the rotation axis 22 of the electric motor 20 is substantially oriented in the up-down direction. The rotation axis 22 of the electric motor 20 may be oriented in the up-down direction, or a direction which is slightly oblique with respect to the up-down direction.

As described above, in the two-wheeled electric vehicle 1 according to various preferred embodiments of the present invention, it is possible to use the belt-drive type secondary speed-reducing mechanism 40, thus improving the freedom in the layout of the electric motor 20, the primary speed-reducing mechanism 30, and the secondary speed-reducing mechanism 40. This allows the electric motor 20 and the primary speed-reducing mechanism 30 to be disposed in the manners shown in FIG. 13 and FIG. 14. According to the present preferred embodiment, it is possible to use the same electric motor 20 and primary speed-reducing mechanism 30 commonly for a plurality of types of vehicle models through mere adjustments of the respective sizes of the drive pulley 41, the drive belt 43, and the driven pulley 42, thus reducing development costs.

Preferred embodiments of the present invention have been described above. The foregoing description of preferred embodiments is a mere illustration of the present invention, and should not be interpreted as limiting the present invention. Preferred embodiments can also emerge from certain combinations of the elements described in the above preferred embodiments. Various changes, substitutions, additions, omissions, etc., can be made to the present invention without departing from the scope defined by the claims and the equivalents thereof.

Preferred embodiments of the present invention are particularly useful in the fields of straddled electric vehicles in which an electric motor is used as a driving source.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddled electric vehicle comprising:
   an electric motor including an output shaft oriented in a direction perpendicular or substantially perpendicular to a vehicle width direction, the electric motor generating rotation around a rotation axis oriented in a direction perpendicular or substantially perpendicular to the vehicle width direction;

a drive bevel gear that rotates around a rotation axis oriented in a direction perpendicular or substantially perpendicular to the vehicle width direction;

a driven bevel gear that rotates around a rotation axis oriented in the vehicle width direction, the driven bevel gear meshing with the drive bevel gear;

a drive pulley that rotates around a rotation axis oriented in the vehicle width direction;

a driven pulley that rotates around a rotation axis oriented in the vehicle width direction;

a drive belt that transmits rotation of the drive pulley to the driven pulley;

a drive wheel to which rotation of the driven pulley is transmitted; and a case that houses at least a portion of the output shaft of the electric motor, the drive bevel gear, the driven bevel gear, and a rotating shaft of the driven bevel gear; wherein the rotation generated by the electric motor is transmitted to the drive bevel gear;

the drive bevel gear and the driven bevel gear convert the rotation transmitted to the drive bevel gear into rotation around a rotation axis oriented in the vehicle width direction;

the rotation generated in response to transmission of rotation from the drive bevel gear to the driven bevel gear is transmitted to the drive pulley; and the rotating shaft of the driven bevel gear is supported inside the case and an entirety of the rotating shaft of the driven bevel gear is located inside the case.

2. The straddled electric vehicle of claim 1, further comprising a speed reducer disposed in a transmission path of motive power between the electric motor and the drive pulley.

3. The straddled electric vehicle of claim 2, wherein,
the speed reducer is disposed in a transmission path of motive power between the driven bevel gear and the drive pulley; and
rotation around a rotation axis oriented in the vehicle width direction is transmitted to the speed reducer.

4. The straddled electric vehicle of claim 1, wherein the driven bevel gear includes more teeth than does the drive bevel gear.

5. The straddled electric vehicle of claim 1, further comprising a centrifugal clutch disposed in a transmission path of motive power between the electric motor and the drive pulley.

6. The straddled electric vehicle of claim 5, wherein the centrifugal clutch is disposed in a transmission path of motive power between the driven bevel gear and the drive pulley.

7. The straddled electric vehicle of claim 6, wherein the centrifugal clutch and the driven bevel gear rotate around a same rotation axis.

8. The straddled electric vehicle of claim 5, wherein the centrifugal clutch is disposed in a transmission path of motive power between the electric motor and the drive bevel gear.

9. The straddled electric vehicle of claim 8, wherein the centrifugal clutch and the output shaft of the electric motor rotate around a same rotation axis.

10. The straddled electric vehicle of claim 1, wherein, in a plan view of the vehicle, the electric motor overlaps a vehicle center line extending in a front-rear direction of the vehicle.

11. The straddled electric vehicle of claim 10, wherein, in a plan view of the vehicle, the output shaft of the electric motor overlaps the vehicle center line.

12. A straddled electric vehicle comprising:
an electric motor including an output shaft oriented in a direction perpendicular or substantially perpendicular to a vehicle width direction, the electric motor generating rotation around a rotation axis oriented in a direction perpendicular or substantially perpendicular to the vehicle width direction;

a drive bevel gear that rotates around a rotation axis oriented in a direction perpendicular or substantially perpendicular to the vehicle width direction;

a driven bevel gear that rotates around a rotation axis oriented in the vehicle width direction, the driven bevel gear meshing with the drive bevel gear;

a drive pulley that rotates around a rotation axis oriented in the vehicle width direction;

a driven pulley that rotates around a rotation axis oriented in the vehicle width direction;

a drive belt that transmits rotation of the drive pulley to the driven pulley;

a drive wheel to which rotation of the driven pulley is transmitted; and a centrifugal clutch disposed in a transmission path of motive power between the electric motor and the drive pulley; and a case that houses at least a portion of the output shaft of the electric motor, the drive bevel gear, the driven bevel gear, and the centrifugal clutch; wherein the rotation generated by the electric motor is transmitted to the drive bevel gear;

the drive bevel gear and the driven bevel gear convert the rotation transmitted to the drive bevel gear into rotation around a rotation axis oriented in the vehicle width direction;

the rotation generated in response to transmission of rotation from the drive bevel gear to the driven bevel gear is transmitted to the drive pulley; and the case includes a wall separating a bevel-gear space that accommodates the drive bevel gear and the driven bevel gear and a centrifugal-clutch space that accommodates the centrifugal clutch.

13. A straddled electric vehicle comprising:
an electric motor including an output shaft oriented in a direction perpendicular or substantially perpendicular to a vehicle width direction, the electric motor generating rotation around a rotation axis oriented in a direction perpendicular or substantially perpendicular to the vehicle width direction;

a drive bevel gear that rotates around a rotation axis oriented in a direction perpendicular or substantially perpendicular to the vehicle width direction;

a driven bevel gear that rotates around a rotation axis oriented in the vehicle width direction, the driven bevel gear meshing with the drive bevel gear;

a drive pulley that rotates around a rotation axis oriented in the vehicle width direction;

a driven pulley that rotates around a rotation axis oriented in the vehicle width direction;

a drive belt that transmits rotation of the drive pulley to the driven pulley; and a drive wheel to which rotation of the driven pulley is transmitted; wherein the rotation generated by the electric motor is transmitted to the drive bevel gear;

the drive bevel gear and the driven bevel gear convert the rotation transmitted to the drive bevel gear into rotation around a rotation axis oriented in the vehicle width direction;

the rotation generated in response to transmission of rotation from the drive bevel gear to the driven bevel gear is transmitted to the drive pulley;

in a plan view of the vehicle, the driven bevel gear is disposed in one of a left region and a right region that are divided at a vehicle center line extending in a front-rear direction of the vehicle; and the drive pulley is disposed in the other of the left region and the right region.

14. A straddled electric vehicle comprising:

an electric motor including an output shaft oriented in a direction perpendicular or substantially perpendicular to a vehicle width direction, the electric motor generating rotation around a rotation axis oriented in a direction perpendicular or substantially perpendicular to the vehicle width direction;

a drive bevel gear that rotates around a rotation axis oriented in a direction perpendicular or substantially perpendicular to the vehicle width direction;

a driven bevel gear that rotates around a rotation axis oriented in the vehicle width direction, the driven bevel gear meshing with the drive bevel gear;

a drive pulley that rotates around a rotation axis oriented in the vehicle width direction;

a driven pulley that rotates around a rotation axis oriented in the vehicle width direction;

a drive belt that transmits rotation of the drive pulley to the driven pulley;

a drive wheel to which rotation of the driven pulley is transmitted; and a speed reducer disposed in a transmission path of motive power between the driven bevel gear and the drive pulley; wherein the rotation generated by the electric motor is transmitted to the drive bevel gear;

the drive bevel gear and the driven bevel gear convert the rotation transmitted to the drive bevel gear into rotation around a rotation axis oriented in the vehicle width direction;

the rotation generated in response to transmission of rotation from the drive bevel gear to the driven bevel gear is transmitted to the drive pulley;

in a plan view of the vehicle, the driven bevel gear is disposed in one of a left region and a right region that are divided at a vehicle center line extending in a front-rear direction of the vehicle; and the speed reducer is disposed in the other of the left region and the right region.

* * * * *